(12) United States Patent
Elmirghani et al.

(10) Patent No.: US 10,498,450 B2
(45) Date of Patent: Dec. 3, 2019

(54) PASSIVE OPTICAL-BASED DATA CENTER NETWORKS

(71) Applicant: UNIVERSITY OF LEEDS, Leeds Yorkshire (GB)

(72) Inventors: Jaafar Elmirghani, Leeds (GB); Taisir El-Gorashi, Leeds (GB); Ali Hammadi, Leeds (GB)

(73) Assignee: UNIVERSITY OF LEEDS, Leeds Yorkshire (GB)

( * ) Notice: Subject to any disclaimer, the term of this patent is extended or adjusted under 35 U.S.C. 154(b) by 0 days.

(21) Appl. No.: 15/529,812

(22) PCT Filed: Nov. 26, 2015

(86) PCT No.: PCT/GB2015/053604
§ 371 (c)(1),
(2) Date: May 25, 2017

(87) PCT Pub. No.: WO2016/083812
PCT Pub. Date: Jun. 2, 2016

(65) Prior Publication Data
US 2017/0324480 A1    Nov. 9, 2017

(30) Foreign Application Priority Data

Nov. 26, 2014  (GB) .................................. 1421014.0

(51) Int. Cl.
*H04B 10/27* (2013.01)
*H04J 14/02* (2006.01)

(52) U.S. Cl.
CPC .......... *H04B 10/27* (2013.01); *H04J 14/0256* (2013.01); *H04J 14/0267* (2013.01); *H04J 14/0282* (2013.01)

(58) Field of Classification Search
CPC ........... H04Q 11/0005; H04Q 11/0001; H04Q 2011/0016; H04Q 2011/0032;
(Continued)

(56) References Cited

U.S. PATENT DOCUMENTS 4,809,362 A     2/1989   Claus et al.
9,225,454 B1 *  12/2015  Liu .................... H04J 14/02
(Continued)

FOREIGN PATENT DOCUMENTS

CN    102882811 A    1/2013
EP    0 614 291 A    9/1994
(Continued)

OTHER PUBLICATIONS

Search Report under Section 17(5) for UK Application No. GB1421014. 0, dated May 29, 2015 (3 pages).
(Continued)

*Primary Examiner* — Don N Vo
(74) *Attorney, Agent, or Firm* — Patterson Thuente Pedersen, P.A.

(57) ABSTRACT

A data center network, comprises a first group of optical ports for connection to respective servers of a first group of servers; a second group of optical ports for connection to respective servers of a second group of servers; a first lower passive optical routing element arranged to route optical communication signals between the first group of optical ports and a first lower optical communication path; a second lower passive optical routing element arranged to route optical communication signals between the second group of optical ports and a second lower optical communication path; an upper passive optical routing element arranged to: (i) route optical communication signals between the first lower optical communication path and an upper optical communication path, and (ii) route optical communication signals between the second lower optical communication path and the upper optical communication path.

25 Claims, 18 Drawing Sheets

(58) Field of Classification Search
CPC . H04Q 2011/0052; H04B 10/27; H04J 14/02; H04J 14/0212; H04J 14/0267; H04J 14/0257; H04J 14/0275; H04J 14/0256; H04J 14/0282
USPC .......................................................... 398/118
See application file for complete search history.

(56) References Cited

U.S. PATENT DOCUMENTS

| | | | |
|---|---|---|---|
| 9,438,970 B2* | 9/2016 | Jones | G02B 6/12019 |
| 2015/0098700 A1* | 4/2015 | Zhu | H04Q 11/0005 398/48 |
| 2016/0261364 A1* | 9/2016 | Jiang | 14/282 |
| 2016/0380838 A1* | 12/2016 | Spock | H04L 41/0806 398/45 |
| 2017/0155465 A9* | 6/2017 | Liboiron-Ladouceur | H04J 14/04 |

FOREIGN PATENT DOCUMENTS

| | | |
|---|---|---|
| EP | 0614291 A1 | 9/1994 |
| JP | H0256128 A | 2/1990 |
| JP | 2013-192064 A | 9/2013 |

OTHER PUBLICATIONS

PCT International Search Report and Written Opinion of ISA for PCT/GB2015/053604 dated Feb. 12, 2016, 15 pages.
Gong Yu et al: "Passive optical interconnects at top of the rack for data center networks", 2014 International Conference on Optical Network Design and Modeling, IFIP, May 19, 2014 (May 19, 2014), pp. 78-83, XP032620070, [retrieved on Jul. 14, 2014].
Ni Wenda et al: "POXN: A New Passive Optical Cross-Connection Network for Low-Cost Power-Efficient Datacenters", Journal of Lightwave Technology, IEEE Service Center, New York, NY, US, vol. 32, No. 8, Apr. 1, 2014, (Apr. 1, 2014), pp. 1482-1500, XP011543338, ISSN: 0733-8724, DOI: 10.1109/JLT.2013.2295599 [retrieved on Mar. 17, 2014].
Hammadi Ali et al: "A survey on architectures and energy efficiency in Data Center Networks", Computer Communications, vol. 40, Mar. 1, 2014 (Mar. 1, 2014), pp. 1-21, XP028609463, ISSN:0140-3664, DOI: 10.1016/J.COMCOM.2013.11.005.
Christoforos Kachris et al: "A Survey on Optical Interconnects for Data Centers", IEEE Communications Surveys and Tutorials, Institute of Electrical and Electronics Engineers, US, vol. 14, No. 4, Oct. 1, 2012 (Oct. 1, 2012), pp. 1021-1036, XP011471439, ISSN: 1553-877X, DOI: 10.1109/SURV.2011.122111.00069.
J. Beals IV, "A terabit capacity passive polymer optical backplane based on a novel meshed waveguide architecture", Appl Phys A (2009) 95: 983-988.
Jayant Baliga et al., "Energy Consumption in Access Networks", OFC/NFOEC 2008, 3 pages.
Chandan Bhagat et al., Technological and cost-based comparison of next geenration PON technologies: I0GPON and WDM PON, University of Colorado, Boulder, May 2, 2011, 15 pages.
Klaus Grobe, Advances in Passive Optical Networks, "Cost and Energy Consumption Analysis of Advanced WDM-PONs", IEEE Communications Magazie, Feb. 2011, pp. S25-S32.
Intel PRO/1000 PT Server Adapter, Trusted PCI Express* Gigabit Copper Connection for Servers, IntelPro Network Connections, 4 pages.
Cisco Catalyst 2960 Series Switches, Cisco Catalyst 2960-8TC-L Compact Switch, Specifications Overview, Jun. 7, 2017, 8 pages.
Cisco Catalyst 2960 Series Switches, Cisco Catalyst 2960-24TC-L Switch, Specifications Overview, Jun. 7, 2017, 8 pages.
Cisco Catalyst 2960 Series Switches, Cisco Catalyst 2960-48TC-L Switch, Specifications Overview, Jun. 7, 2017, 8 pages.
Philip N. Ji, "Design and Evaluation of a Flexible-Bandwidth OFDM-Based Intra-Data Center Interconnect", IEEE Journal of Selected Topics in Quantum Electronics, vol. 19, No. 2, Mar./Apr. 2013, 10 pages.
Christoforos Kachris et al., Power Consumption evaluation of Hybrid WDM PON Networks for Data Centers, NOC 2011, IEEE, pp. 118-121.
Examination Report for European Application No. 15804206.9, dated Dec. 12, 2018, 10 pages.
Duraisamy et al., "POST: a scalable optical data center network", Photonic Network Communication, Kluwer Academic Publishers, Dordrecht, NL, vol. 28, No. 2, Aug. 28, 2014, pp. 190-202.
Karthi.D et al., "POST: a Scalable Optical Data Center Network", 2013 IEEE International Conference on Advanced Networks and Telecommunications Systems (ANTS), Dec. 15, 2013.
Luo et al., "Cloud Computing Provisioning over Passive Optical Networks", First IEEE International Conference on Communications in China: Optical Networks and Systems (ONS), Aug. 15, 2012.
Ji et al., "Design and Evaluation of a Flexible-Bandwidth OFDM-Based Intra-Data Center Interconnect", IEEE Journal of Selected Topics in Quantum Electronics, vol. 19, No. 2, Mar./Apr. 2013, published Jul. 18, 2012.
Assi et al., "Dynamic Bandwidth Allocation for Quality-of-Service Over Ethernet PONs", IEEE Journal on Selected Areas in Communications, vol. 21, No. 9, Nov. 3, 2003.
McGarry et al., "Ethernet Passive Optical Network Architectures and Dynamic Bandwidth Allocation Algorithms", IEEE Communications Surveys, 3rd Quarter 2008, vol. 10, No. 3, Sep. 16, 2008.
Kliazovich et al., "GreenCloud: A Packet-level Simulator of Energy-aware Cloud Computing Data Centers", 2010 IEEE Global Telecommunications Conference Globecom 2010, Dec. 6, 2010.
Shin et al., "Hybrid WDM/TDM-PON With Wavelength-Selection-Free Transmitters", Journal of Lightwave Technology, vol. 23, No. 1, Jan. 10, 2005.
Kramer et al., "IPACT: A Dynamic Protocol for an Ethernet PON (EPON)", IEEE Communications Magazine, vol. 40, Issue 2, Feb. 2002.
Benson et al., "Network Traffic Characteristics of Data Centers in the Wild", Imc '10 Proceedings of the 10th ACM SIGCOMM conference on Internet measurement, Nov. 1, 2010.
Zhang et al., "On Architecture Design, Congestion Notification, TCP Incast and Power Consumption in Data Centers", IEEE Communications Surveys & Tutorials, vol. 15, No. 1, First Quarter 2013, published Jan. 11, 2012.
Kachris et al., "Power Consumption evaluation of Hybrid WDM PON Networks for Data Centers", 2011 16th European Conference on Networks and Optical Communications, Jul. 20, 2011.
Zheng et al., "A survey of dynamic bandwidth allocation algorithms for Ethernet Passive Optical Networks", Optical Switching and Networking 6 (2009) 151-162, available online Mar. 31, 2009.
Beals et al., "Terabit Capacity Passive Polymer Optical Backplane", Applied Physics A, vol. 95, Issue 4, pp. 983-988, published online Feb. 13, 2009.
Martin, Thomas, "Fiber to the Home", 2007, 56 pages.

* cited by examiner

540a

540b

PASSIVE OPTICAL-BASED DATA CENTER NETWORKS

RELATED APPLICATIONS

The present application is a National Phase entry PCT Application No. PCT/GB2015/053604, filed Nov. 26, 2015, which claims priority from GB Patent Application No. 1421014.0, filed Nov. 26, 2014, said applications being hereby incorporated by reference herein in their entirety.

Aspects of the invention relate to data centers and data center networks. In particular, embodiments relate to energy efficient data centres and data centre designs.

BACKGROUND

Recent years have witnessed an unprecedented growth in services and applications housed in modern data centers, such as web-search, scientific computations, social networks, file storage and distributed files systems. Today's data centers may host hundreds of thousands of servers, interconnected via switches, routers and high-speed links, making the choice of networking architecture within the data center of premium importance, as it impacts the data center scalability, cost, fault-tolerance, agility and power consumption.

Significant research effort has been devoted over the last decade to design efficient data center networks. However, major concerns have recently been raised about the power consumption of data centers and its impact on global warming and on the electricity bill of data centers. The US Environmental Protection Agency (EPA) has reported that power usage of data centers in the US has doubled between 2000 and 2006 to nearly 61 billion kilowatt-hours, accounting for 1.5% of the US total electricity demand.

Given the steadily increasing number of servers and the exponentially growing traffic inside data centers, conventional data centers networking architectures suffer from performance limitations such as links oversubscription and inefficient load balancing.

BRIEF SUMMARY OF THE DISCLOSURE

According to an aspect, a data centre network comprises a first group of optical ports for connection to respective servers of a first group of servers; a second group of optical ports for connection to respective servers of a second group of servers; a first lower passive optical routing element arranged to route optical communication signals between the first group of optical ports and a first lower optical communication path; a second lower passive optical routing element arranged to route optical communication signals between the second group of optical ports and a second lower optical communication path; an upper passive optical routing element arranged to: (i) route optical communication signals between the first lower optical communication path and an upper optical communication path, and (ii) route optical communication signals between the second lower optical communication path and the upper optical communication path.

The data centre network may further comprise a first intra-group passive optical network, the first intra-group passive optical network forming passive optical communication paths between the servers in the first group of servers, and a second intra-group passive optical network, the second intra-group passive optical network forming passive optical communication paths between the servers in the second group of servers, wherein the first and second intra-group passive optical networks do not include the upper passive optical routing element.

The data centre network may be such that the first intra-group passive optical network comprises a star reflector arranged to receive an optical signal from any server of the first group of servers and broadcast the optical signal to each other server of the first group of servers.

The data centre network may be such that the first intra-group passive optical network comprises a fibre Bragg grating in the first lower optical communication path, the fibre Bragg grating arranged to: receive signals of a first wavelength and a second wavelength from the first group of servers, transmit signals of the first wavelength along the first lower optical communication path, and reflect signals of the second wavelength back to the servers of the first group of servers.

The data centre network may be such that the first intra-group passive optical network comprises a passive polymer optical backplane.

The data centre network may be such that each of the first, second and third passive optical routing elements is selected from the group consisting of a star splitter/coupler, or an array waveguide router.

The data centre network may be such that signals routed via each of the first lower optical communication path, second lower optical communication path and upper optical communication path are to be at least one of time-division multiplexed and frequency-division multiplexed.

The data centre network may be such that the first lower communication path is a direct connection between the first lower passive optical routing element and the upper passive optical routing element, and the second lower communication path is a direct connection between the second lower passive optical routing element and the upper passive optical routing element.

The data centre network may be such that signals to be carried by each of the first lower optical communication path, second lower optical communication path and upper communication path are to be time-division multiplexed.

The data centre network may be such that signals to be carried by each of the first and second lower optical communication paths are time-division multiplexed, and signals to be carried by the upper communication path are time-division multiplexed and frequency-division multiplexed.

The data centre network may further comprise an inter-group passive optical communication path between the servers of the first group and the servers of the second group, wherein the inter-group passive optical communication path includes the first and second passive optical routing elements, but excludes the third passive optical routing element.

The data centre network may comprise N groups of optical ports for connection to respective servers of N groups of servers, the N groups of optical ports including the first group of optical ports and the second group of optical ports, and the N groups of servers including the first group of servers and the second group of servers, first and second intermediate passive optical routing elements, first and second intermediate passive optical routing elements each having N input ports for optical signals and N output ports for optical signals, first and second intermediate passive optical routing elements arranged such that each signal received at an input port is routed to an output port based on a wavelength of the signal, wherein for each input port, input signals of N distinct wavelengths are routed to different ones of the N output ports, and each input port and each output port of the first intermediate passive optical routing element is connected to one of a lower passive optical routing element associated with one of the groups of servers, the upper passive optical routing element, or the second intermediate passive optical routing element, each input and each output of the second intermediate passive optical routing element is connected to one of a lower passive optical routing element associated with one of the groups of servers, the upper passive optical routing element, or the first intermediate passive optical routing element, and the first and second lower optical communication paths include at least one of the first and second intermediate passive optical routing elements.

The data centre network may be such that the first lower optical communication path comprises: a first routing server to receive optical signals from the servers of the first group of servers via the first lower passive optical routing element and retransmit the signals at respective wavelengths based on respective destinations of the signals, and a first intermediate passive optical routing element associated with the first routing server to route signals from the first routing server to the upper passive optical routing element or a second passive optical routing element associated with a routing server other than the first routing server.

The data centre network may be such that the second optical communication path comprises: a second routing server to receive optical signals from the servers of the second group of servers via the second lower passive optical routing element and retransmit the signals at respective wavelengths based on respective destinations of the signals, and a second intermediate passive optical routing element associated with the second routing server to route signals from the second routing server to the upper passive optical routing element or an intermediate passive optical routing element associated with a routing server other than the second routing server.

The data centre network may be such that the first routing server receives signals from at least two groups of servers via respective lower passive optical routing elements.

The data centre network may further comprise a first set optical ports for connection to respective servers comprising a first plurality of groups of optical ports, the first plurality of groups of optical ports including the first group of optical ports; a second set of optical ports connection to respective servers comprising a second plurality of groups of optical ports, the second plurality of groups of optical ports including the second group of optical ports, wherein the first set of optical ports includes a first set-linking group of optical ports, each optical port in the first set-linking group of optical ports being in optical communication with an inter-set communication path, the second set of optical ports includes a second set-linking group of optical ports, each optical port in the second set-linking group of optical ports being in optical communication with the inter-set communication path, the data centre network further comprising a first intra-set communication path arranged to route signals between servers connected to optical ports in the first group of optical ports and servers connected to optical ports in the first set-linking group of optical ports, and the data centre network further comprising a second intra-set communication path arranged to route signals between servers connected to optical ports in the second group of optical ports and servers connected to optical ports in the second set-linking group of optical ports.

According to an aspect a data centre network system comprises an optical line terminal switch, comprising a plurality of optical line terminal cards, the optical line terminal cards each having a plurality of optical line terminal ports; a plurality of sub-networks connected to respective optical line terminal ports of the plurality of optical line terminal ports, wherein at least one of the sub-networks is a network as described above.

BRIEF DESCRIPTION OF THE DRAWINGS

Embodiments of the invention are further described hereinafter with reference to the accompanying drawings, in which:

FIG. 7b illustrates routing by passive optical routing elements suitable for use in embodiments according to FIG. 7a.

DETAILED DESCRIPTION

Figure 1:
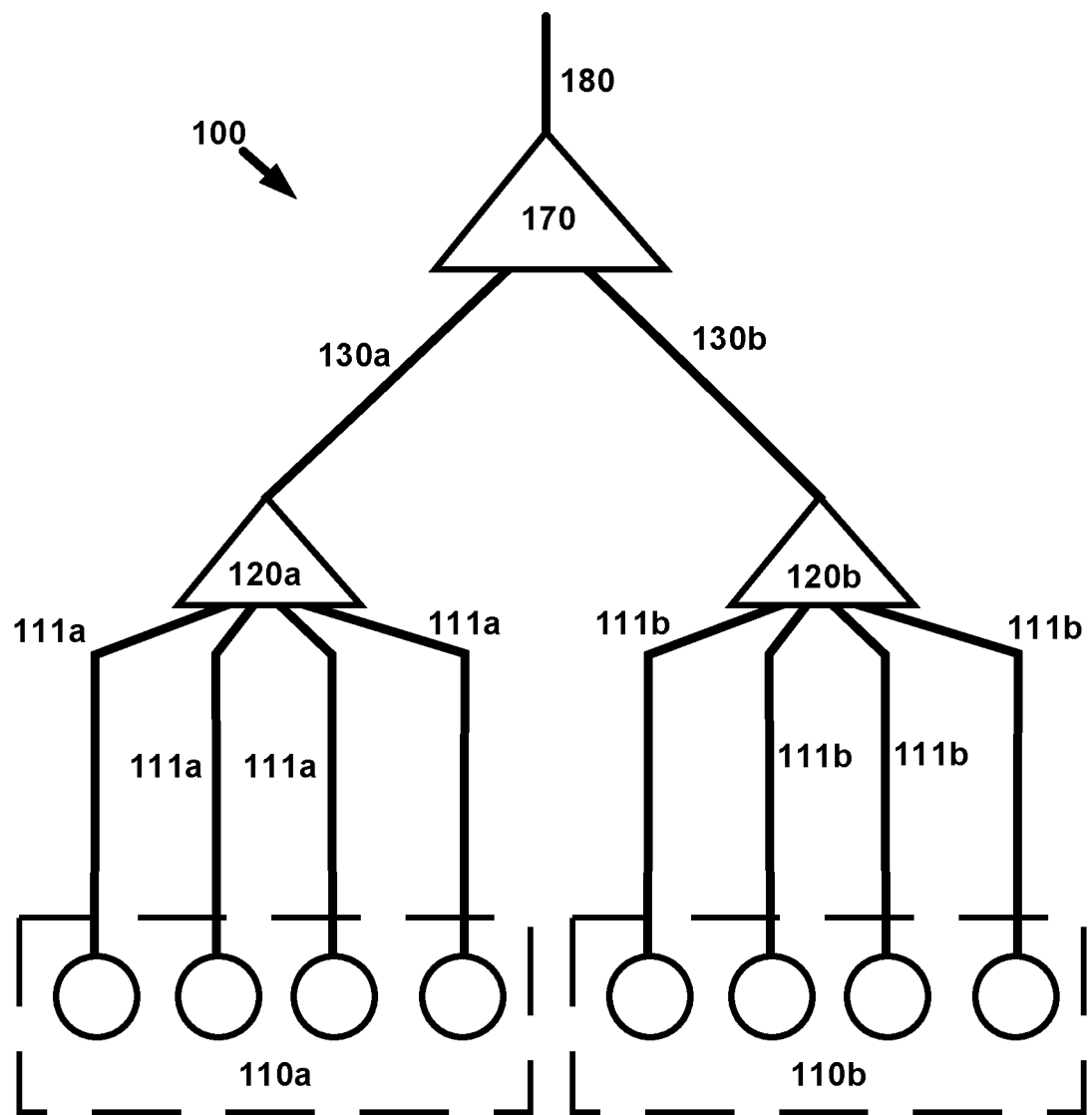
FIG. 1 illustrates a network, or sub-network according to some embodiments.

FIG. 1 shows a data center network according to some embodiments. The data center network 100 of FIG. 1 contains a first group of optical ports 110a for connection to respective servers of a first group of servers, a second group of optical ports 110b for connection to a second group of servers and a first lower passive optical routing element 120a. The first lower passive optical routing element 120a is arranged to route optical communication signals between the first group of optical ports 110a and a first lower optical communication path 130a. A second lower passive optical routing element 120b is arranged to route optical communication signals between the second group of optical ports 110b and a second lower optical communication path 130b. An upper passive routing element 170 is arranged to:
1. Route optical communication signals between the first lower optical communication path 130a and an upper optical communication path 180, and
2. Route optical communication signals between the second lower optical communication path 130b and the upper optical communication path 180.

As used herein, the terms "upper" and "lower" refer to the hierarchy or the network topology, and does not relate to physical locations of the elements.

Signals may be carried between the first group of optical ports 110a and the first lower passive optical routing element 120a by respective first data connections 111a associated with each of the first group of optical pots 110a. Similarly, second data connections 111b may be provided to carry signals between the second group of optical ports 110b and the second lower passive optical routing element. In some embodiments, the data connections 111a, 111b may be passive optical connections, such that the data connection between the first/second group of optical ports and the first/second lower passive optical routing element is entirely optical and includes only passive elements. The data connections 111a, 111b may include optical fibres. For example, a respective optical fibre may extend between each optical port of the first group of optical ports 110a and the first lower passive optical routing element 120a.

As used in the above description "between" can signify that communication can be in the uplink, downlink or both, e.g. from upper optical path 180 to server ports 110, from server ports 110 to upper optical path 180, or both. Transmissions for uplink and downlink may be sent via the same communication paths, or via separate communication paths. In some examples having separate uplink and downlink communication paths, respective uplink and downlink networks may be provided. The separate uplink and downlink networks may have similar or identical structures, such as the structure shown in FIG. 1.

The upper communication path 180 may connect to a further switching element, allowing further distribution of signals. This further switching element may be passive or non-passive. The upper optical communication path 180 may be connected to an optical line terminal (OLT) port. In some embodiments an OLT card may include a plurality of OLT ports, each connected to a separate optical network. Each optical network may have a structure similar to that shown in FIG. 1, with the respective upper optical communication path 180 of each optical network connected to a respective OLT port of the OLT card. Furthermore, an OLT chassis may comprise a plurality of OLT cards and an OLT switch may comprise a plurality of OLT chassis. This arrangement may allow communication between OLT ports on the same or different OLT cards within the OLT switch. In such an arrangement, a server connected to an optical port of the first group of optical ports 110a of FIG. 1 may be connected to a first OLT card of an OLT switch via the first lower passive optical element 120a and the upper passive optical element 170, and may communicate with another server connected to a second OLT card of the OLT switch via the OLT switch and the respective optical networks of the servers.

The arrangement of FIG. 1 provides a hierarchical network suitable for use in a data centre. The arrangement allows routing of signals between servers in the first group of servers and the upper optical communication path using passive optical elements, and requires few or no active elements. Conventional data centre architectures are based on expensive and power hungry devices, such as access switches, aggregation switches and core switches, accounting for 20% of the total power consumption of a data centre. Embodiments according to the arrangement of FIG. 1 allow power-hungry access switches and aggregation switches to be replaced by optical and passive switches. Moreover, according to some examples the connectivity of the network may be improved, as intra-group and inter-group communication does not have to travel between higher level switches.

Each port of the groups of optical ports 110a, 110b may be connected to servers. The servers within each group may form a part of a rack, a whole rack, or a group of racks. Herein, a group of servers are the servers connected to optical ports within the same group of optical ports. The number of ports should not be considered limited by the number shown in FIG. 1, as a group may have more, less or the same number of ports shown. The connections 111a, 111b from the optical ports 110a, 110b to the passive optical routing elements 120a, 120b may be optical fiber, or another form of waveguide. There may be additional waveguides not shown on FIG. 1, for example a port may have separate uplink and downlink connections or may have extra connections for redundancy.

Each of the optical communication paths 130a, 130b, 180 may be an optical fibre, such as a single mode fibre or a multimode fibre. According to some embodiments, the fibre may be designed to be used with wavelengths ~1.55 µm, 1.30 µm, or with wavelengths greater than 2 µm, but is not particularly limited in this regard. The optical communication paths 130a, 130b, 180 may connect directly between routing elements, where a direct connection is one in which no other optical devices are connected. A single optical fibre connected to two elements is an example of a direct connection. Alternatively the connection may be non-direct, where one or more passive optical devices or active devices may be connected between the endpoints. In some embodiments, each of the first and second lower optical communication paths, and the upper optical communication path may be passive optical paths (i.e. include only passive optical elements, without active elements in the path).

The passive optical routing elements 120a, 120b, 170 can be compared to the MUX/DEMUX of an active switch, as they either combine multiple signals/paths into one signal/path, or separate one signal/path into multiple signals/paths. The passive optical routing elements 120a, 120b, 170 may be unidirectional. In such cases, separate networks may be provided for uplink and downlink communication to permit bi-directional communication; the uplink and downlink networks may have similar structures, with splitting elements in the downlink network and combining/coupling elements in the uplink network. The passive optical routing elements 120a, 120b, 170 may be any passive optical element suitable for directing signals in the required manner. For example, each passive optical routing element may be a star coupler, a star reflector, or an arrayed waveguide guiding router (AWGR).

The passive optical network of FIG. 1 may be implemented using time-division multiplexing (TDM). In this case, time periods may be assigned for communication with respective ports within a group 110a-b. In the uplink direction, i.e. communication from the server towards the upper communication path 170, servers compete to access the shared transmission channel, such as the upper and/or lower communication paths 120*a*, 120*b*, 170. Various bandwidth allocation algorithms may be used to enhance media access in the network. For example, in static bandwidth allocation algorithms, servers may be assigned a predefined bandwidth whether there is a need to use it or not. In a further example, dynamic bandwidth allocation algorithms allocate bandwidth dynamically based on demand, quality of service requirements, and resources availability. Use of TDM may avoid multiple, competing signals being communicated from servers within the same group on the corresponding lower optical communication path 130*a-b*. Further, the use of TDM may permit addressing of signals to a specific server, such that each server need only listen to (i.e. receive and process) signals in the time period assigned for that server to receive a signal, permitting the server or communication components of the server to sleep, and hence providing energy saving opportunities. Similarly, TDM may avoid competing signals from different servers of the same or different groups on the upper optical communication path 180. When TDM is used, the passive optical routing elements 120*a*, 120*b*, 170 may be optical splitters and/or optical couplers (e.g. star couplers or star reflectors).

An alternative to TDM is wavelength-division multiplexing (WDM). WDM may be implemented in optical networks of some embodiments, and may avoid resource sharing among servers through the use of multiple wavelengths. In this case, the wavelength of the optical signal is selected based on the source and/or destination of a signal. As with TDM, WDM permits differing signals to share a common communication path, and also provides a means for "addressing" the signal. Where WDM is used, passive optical routing elements 120*a*, 120*b*, 170 may be array waveguide grating routers (AWGR), which route the signals to different paths depending upon the wavelength of the signal.

According to a further alternative, a combination of TDM and WDM may be used. This is referred to herein as hybrid TDM-WDM, and in hybrid TDM-WDM arrangements, a combination of optical splitters/couplers and AWGR may be used. In some examples, wavelengths can be dynamically assigned and shared by multiple servers located in different networks or different portions of the same network. The ability to dynamically tune to different wavelengths, may allow servers to join other TDM-PONs, which can enhance the bandwidth utilization at low loads and may also avoid congestions at high loads.

According to some embodiments in accordance with the arrangement of FIG. 1, the network may be a hybrid TDM-WDM optical network, and may use a multi-carrier generator. At the server end, low cost multimode transceivers can be employed to directly modulate the carrier signal received from the OLT for the upstream transmission. This allows the number of expensive laser diodes at the OLT to be reduced, and eliminates the need for laser diodes at the servers.

Figure 2:
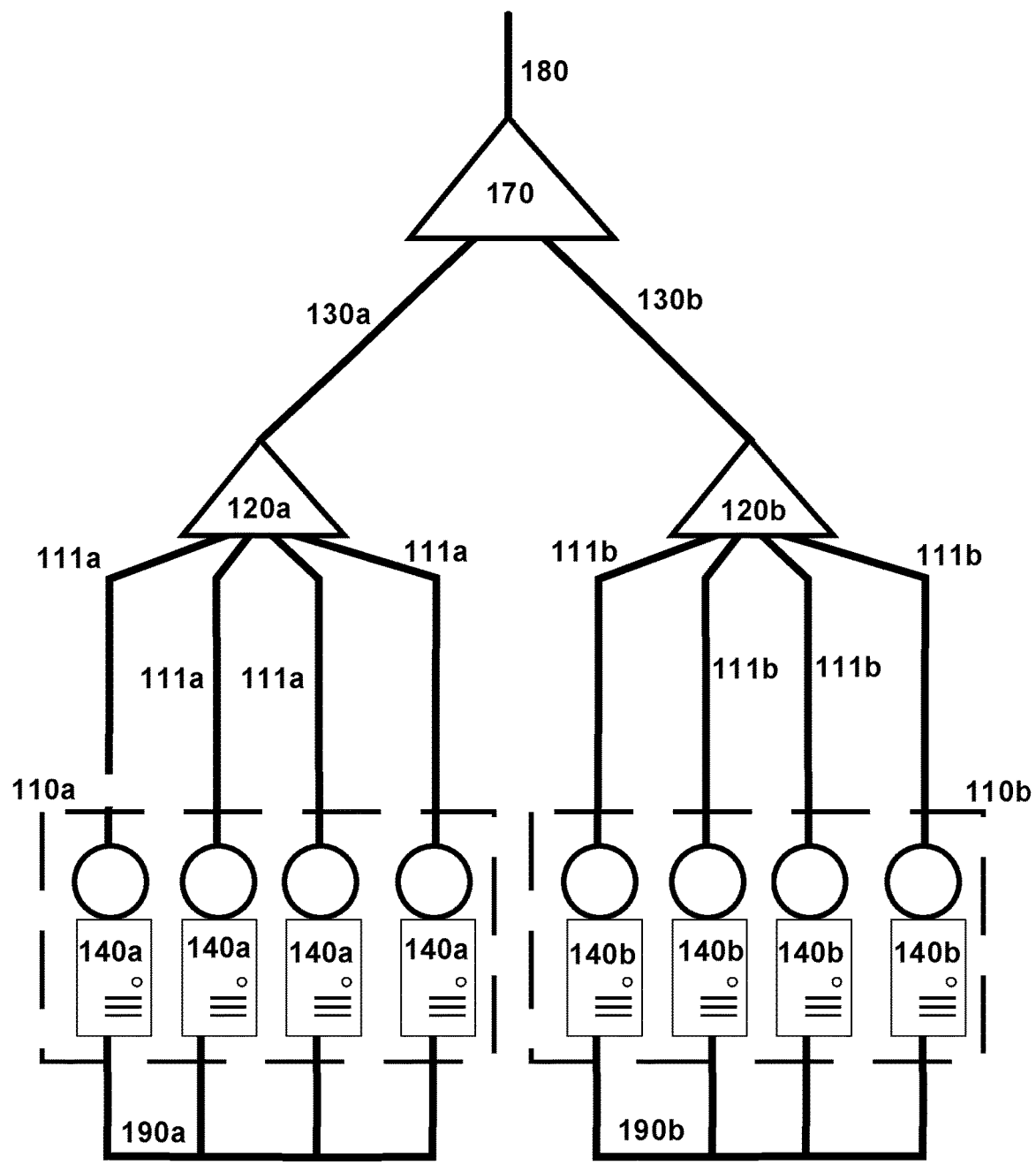
FIG. 2 illustrates a network, or sub-network according to some embodiments.

FIG. 2 illustrates an arrangement according to some embodiments. This arrangement is similar to that of FIG. 1. In addition to the elements of FIG. 1, each group of servers/optical ports 110*a*, 110*b* has an associated intra-group passive optical network 190*a*, 190*b*. The intra-group passive optical network 190*a*, 190*b* allows communication between servers in a group, without routing the communication via the upper passive optical routing element 170. In some examples, the intra-group passive optical network 190*a*, 190*b* allows communication between servers in a group, without routing the communication via the lower passive optical element associated with that group. This improves efficiency for intra-group communications.

The percentage of inter-rack and intra-rack traffic within a data centre may typically vary between 20-80% depending on the type of data centre and the applications running. In some embodiments, a group may correspond with a rack. Accordingly, providing intra-group communication that does not rely on routing via the OLT switch may help to avoid over-loading the OLT, which may otherwise become the bottleneck for all types of traffic. Accordingly, embodiments according to FIG. 2 may avoid undesired delays and power consumption resulting from Optical/Electrical/Optical conversions, queuing, buffering and processing.

FIG. 2 illustrates the servers in the first and second groups of servers 140*a*, 140*b* in the network.

Figure 3A:
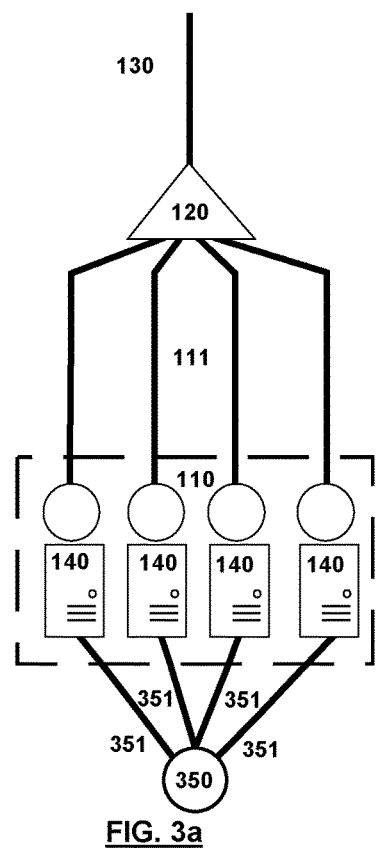
FIGS. 3a-c illustrate arrangements for intra-group communication, in accordance with some embodiments.
Figure 3B:
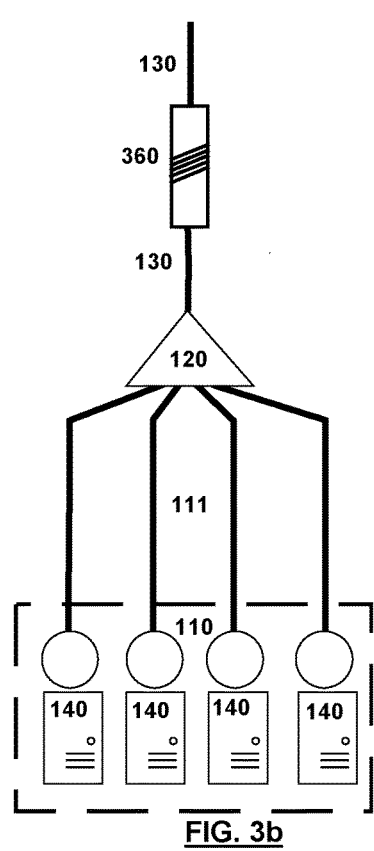
Figure 3C:
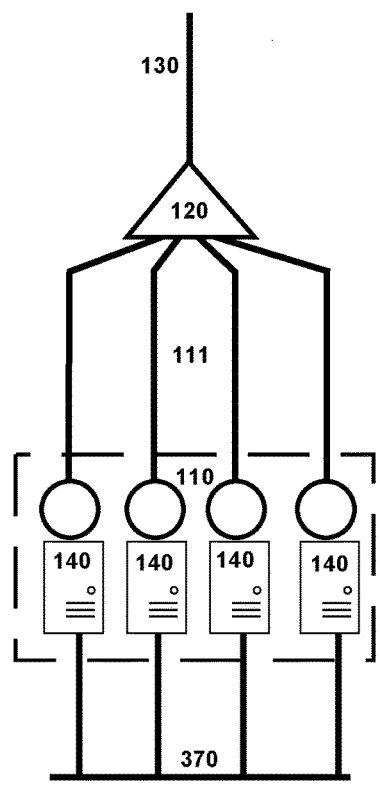

Embodiments of the intra-group passive optical network are illustrated in FIGS. 3*a-c*. These embodiments may permit higher bandwidth for each rack, and reduce congestion.

In order to improve intra-group communication, without routing via the OLT, or upper passive optical routing element, various methods can be used. FIGS. 3*a-c* illustrate examples of arrangements providing such intra-group communication. In each of FIGS. 3*a-c*, a group of optical ports 110 are provided for connection to respective servers 140. The ports 110 are connected using optical connections 111 to a lower routing element 120. The routing element 120 is designed to route the signals via optical path 130 to a further routing element, such as the upper routing element described previously, and which may, in turn, route the signal to an OLT port.

FIG. 3*a* shows an arrangement in which each server has a first transceiver for optical connection with the optical ports 110, and a second transceiver for connection via optical path 351 to a component 350. Component 350 is arranged to reflect signals from one server in a group to all servers in the group, in some embodiments this device is a passive star reflector. This allows each server to broadcast to all other servers in the same group. Intra-group communication via optical path 351 and component 350 may be controlled according to a media access control (MAC) protocol to coordinate and arbitrate channel access. Some embodiments may make use of time division multiple access (TDMA) for communication via component 350.

In the arrangement of FIG. 3*b*, a fiber Bragg grating (FBG) 360 is connected in the lower optical path 130. The FBG 360 reflects selected wavelengths but allows all others to pass. The reflected wavelengths enable intra-rack communication and the transmitted wavelengths may communicate with the OLT and other groups. According to some arrangements, a dedicated wavelength for each group of servers can be assigned, where one wavelength is used for intra-group communication, and others for communication with OLT and/or other groups. The same wavelength may be assigned for intra-group communication for more than one group, since signals having that wavelength do not propagate outside of the group. Where all groups have the same wavelength for intra-group communication, uniformity across the network is improved, and the wavelengths available for signaling are used efficiently.

In some embodiments, each server 140 is arranged to communicate via the lower passive optical routing element 120 using at least two wavelengths, with one wavelength being reflected by the FBG 360 and being used for intra-group communication, and one wavelength being transmitted by the FBG 360 and being used for communication with endpoints outside the group (e.g. with an OLT port or a server in another group). Additional wavelengths may also be used, with each being assigned to intra-group communication or communication with elements outside the group. In some arrangements, two or more FBG 360 may be used, in order to reflect different respective wavelengths.

In some arrangements, OFDM technology may be used to allow a single transceiver to generate multiple carriers (e.g. one for intra-group communication and one for communication with elements outside the group).

In some arrangements, each server 140 in the group may be equipped with a first transceiver to generate signals for communication with elements outside the group at a wavelength that is transmitted by the FBG 360, and a second multi-wavelength transceiver to generate signals for intra-group communication at a wavelength that is reflected by the FBG 360. This communication may be implemented using TDMA. These arrangements may be implemented without using OFDM transceivers, and so may reduce cost.

FIG. 3*b* has been described as using a FBG 360. However, any passive optical element that selectively reflects or transmits a received signal based on a wavelength of the signal may alternatively be used.

In the arrangement of FIG. 3*c*, each port/server group 110 includes a backplane 370, in some embodiments this backplane 370 is a passive polymer backplane, and may be a passive backplane with multimode polymer waveguides (such as that described in J. Beals IV, N. Bamiedakis, A. Wonfor, R. Penty, I. White, J. DeGroot Jr, et al., "A terabit capacity passive polymer optical backplane based on a novel meshed waveguide architecture," Applied Physics A, vol. 95, pp. 983-988, 2009). In some embodiments, such a backplane may provide a non-blocking, full mesh connectivity with 10 Gb/s rates per waveguide, exhibiting a total capacity of 1 Tb/s. The backplane may be integrated with the servers, or separate from the servers.

In the arrangement of FIG. 3*c*, no MAC is required, which may reduce complexity relative to arrangements requiring MAC.

In some embodiments, regeneration may be implemented to allow for communication in large groups, e.g. in large racks. Regeneration may be carried out using dedicated regenerators on the backplane itself, for example using Optical to Electrical conversion followed by electrical signal regeneration and finally Electrical to Optical conversion. In some embodiments, regeneration may be performed using the transceivers in the servers and processing electronics to perform the regeneration. The use of the transceivers in the servers for regeneration may reduce cost compared to arrangements having dedicated regenerators mounted on the backplane. In some embodiments, the regeneration may be performed purely optically, e.g. by using an optical amplifier.

Figure 4A:
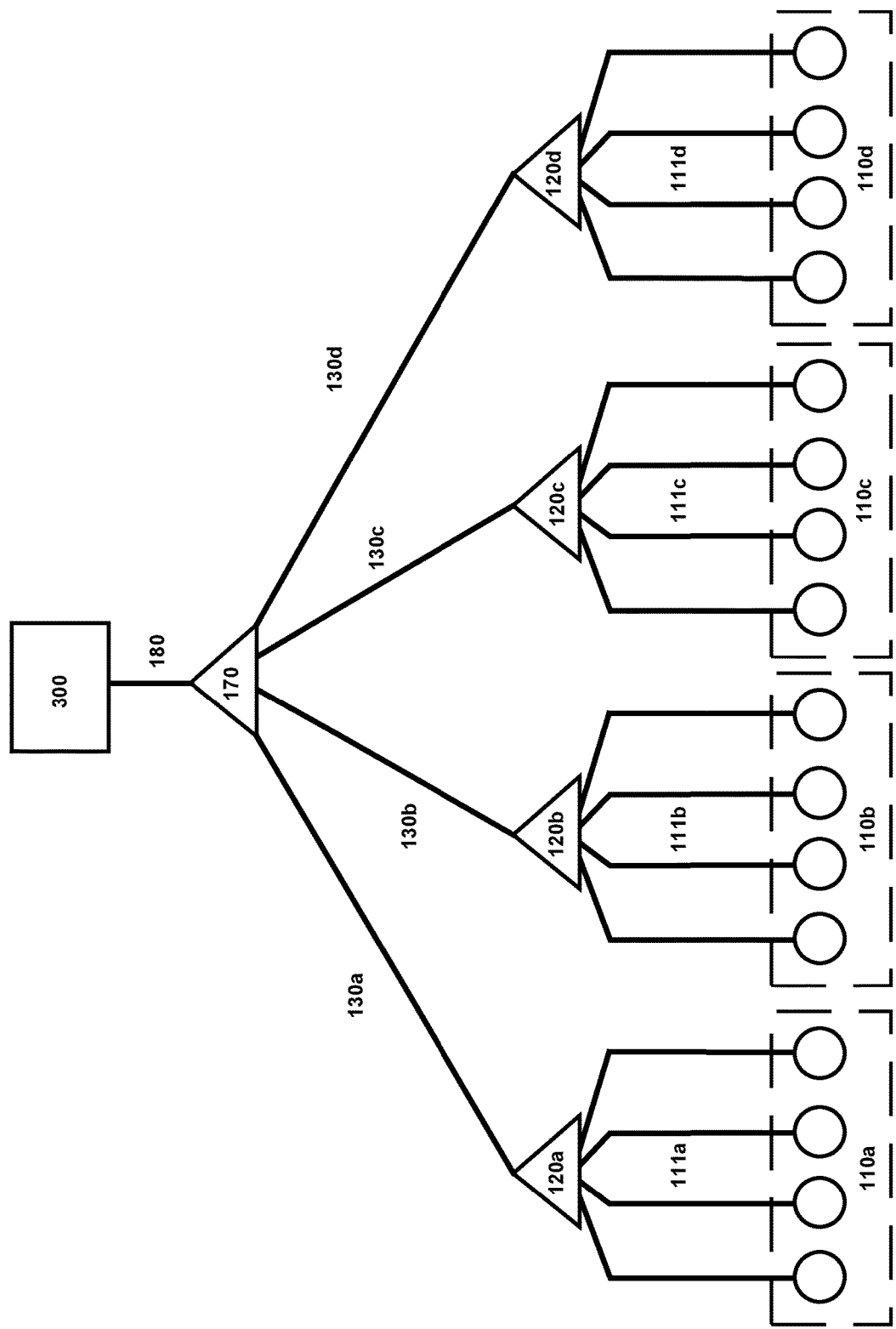
FIGS. 4a-b illustrate networks, or sub-networks according to some embodiments.

FIG. 4*a* depicts an arrangement in accordance with some embodiments of the invention. Four groups of optical ports are provided 110*a-d* for connection to four respective groups of servers, where each group of optical ports 110*a-d* are connected to a respective lower passive optical routing element 120*a-d* by optical connections 111*a-d*. Each lower passive optical routing element 120*a-d* is connected to an upper passive optical routing element 170 via an optical communication path 130*a*-d. The upper passive optical routing element 170 in turn connects to a component 300 via upper optical communication path 180.

FIG. 4*a* illustrates four groups of ports 110*a-d*, but more or fewer groups of ports may be provided. In some embodiments the four groups of optical ports 110*a-d* have connections for 128 servers, distributed among the four groups. These servers may be evenly distributed (32 in each group), or alternatively may be distributed on another basis, e.g. depending upon space limitations, and/or network requirements. Embodiments may have more or fewer groups of optical ports.

In some embodiments the optical component 300 may be an OLT port, for example in an OLT card. In some embodiments connectivity is based on a TDM architecture in which a pair of wavelengths is used, one for the upstream communication and one for downstream communication. In this embodiment no wavelength selectivity of the passive optical routing elements is required, and the passive optical routing elements 120*a-d* and 170 may be passive star splitters and/or star couplers. This arrangement may be implemented without requiring multi-wavelength transceivers, and so cost and complexity may be reduced.

Figure 4B:
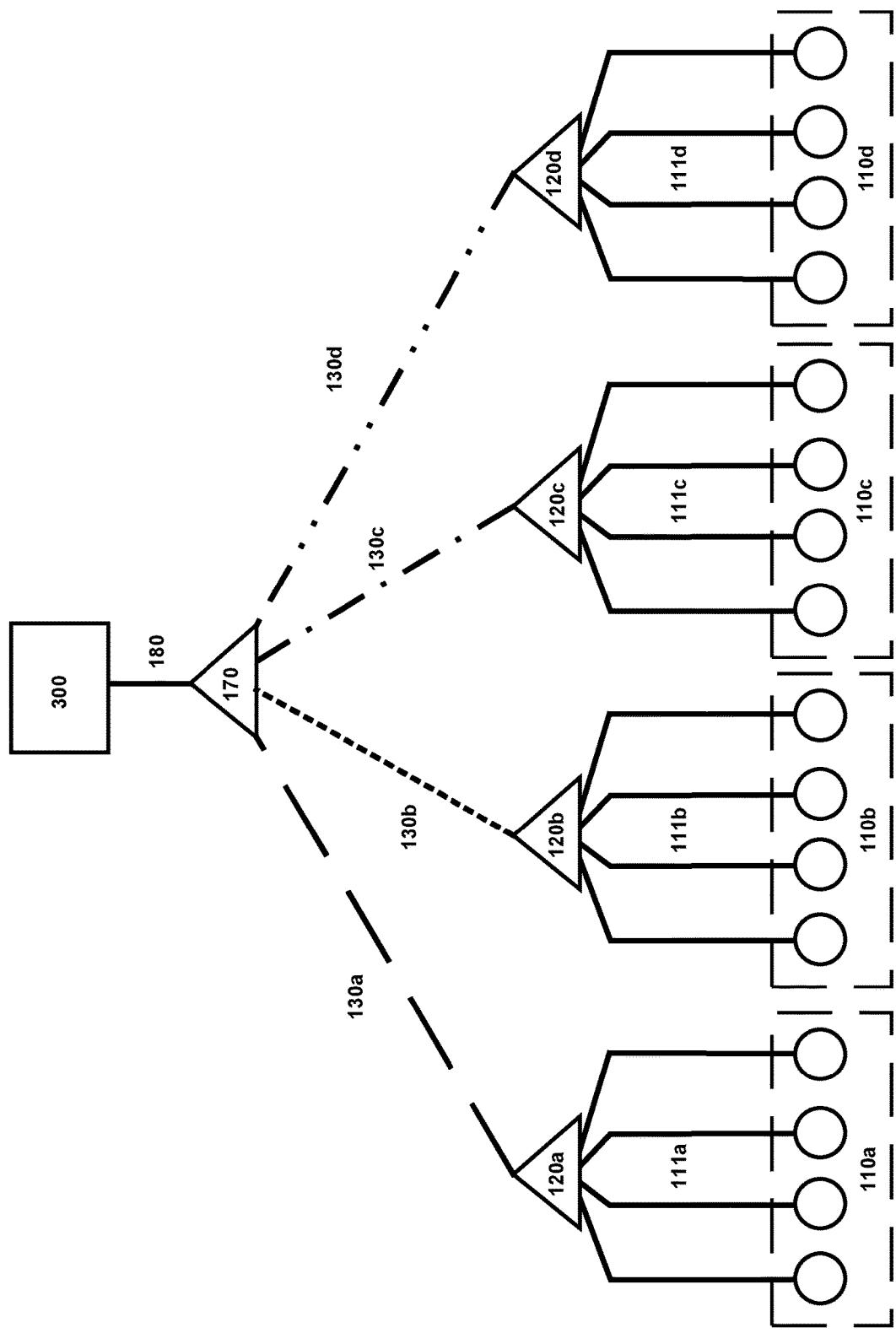

In some embodiments connectivity is based on a hybrid TDM-WDM architecture as exemplified by FIG. 4*b* where 4 pairs of wavelengths are used to communicate with 4 groups of servers, each pair of wavelengths being associated with a respective group of ports 110*a-d* and having a wavelength for uplink and a wavelength for downlink. Each pair of wavelengths is illustrated with a different line style. In this embodiment passive optical routing element 170 may be an AWGR which routes each respective pair of wavelengths along a corresponding optical path 130*a-d*, and each optical path in turn routes the pairs of wavelengths via passive optical routing elements 120*a-d*, which may be passive star couplers and/or splitters, to a group of ports for connection to servers. For communication to/from a specific server within each group of servers, TDM may be used. All four pairs of wavelengths may be carried by upper communication path 180.

The arrangement of FIG. 4*b* may reduce congestion and facilitate more bandwidth for each group of servers. As noted in relation to FIG. 1, a multi-carrier generator can be used to avoid the need for laser diodes at the servers.

Embodiments according to FIGS. 4*a* and 4*b* may include an intra-group passive optical network, as described in relation to FIGS. 2 and 3*a-c*. This may avoid the need to forward intra-group traffic via OLT port 300.

The arrangements of FIGS. 4*a* and 4*b* may be implemented without requiring tunable lasers, thus reducing costs. In some embodiments according to FIG. 4*b*, each server has a single-wavelength laser for generating the wavelength associated with its group.

The arrangements of FIGS. 4*a* and 4*b* may be implemented with relatively simple wiring arrangements, facilitating set-up and maintenance of the network.

Figure 5:
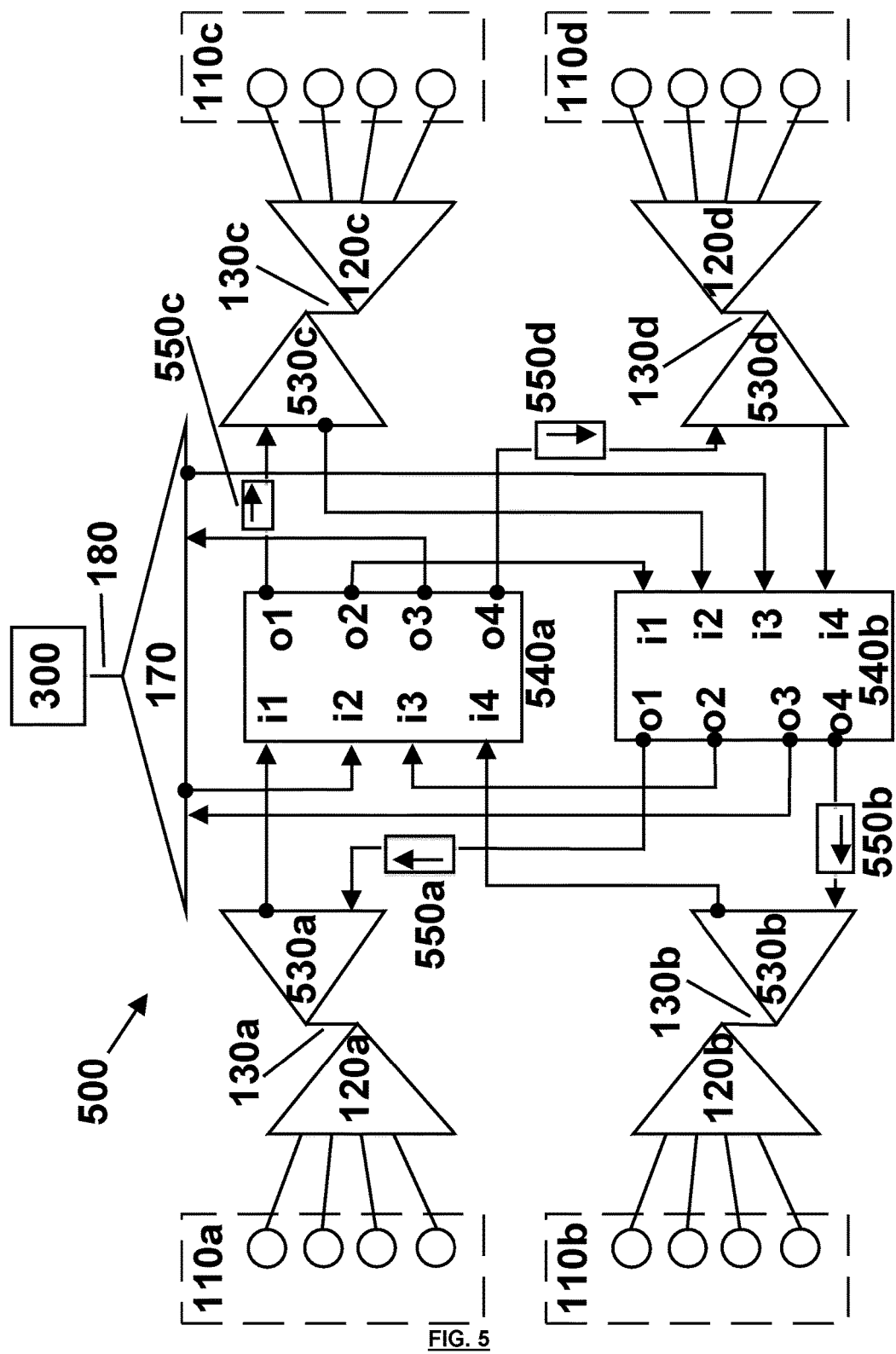
FIG. 5 illustrates a network, or sub-network according to some embodiments.

Embodiments according to FIG. 5 allow inter-group communication comprising inter-group communication paths that route between any group of servers 110*a-d* and any other group of servers 110*a-d* hierarchically below the upper passive optical routing element 170. According to the arrangement 500 in FIG. 5, these inter-group communication paths may be passive communication paths. Embodiments according to the arrangement of FIG. 5 provide inter-group communication paths that are not routed via the upper passive optical routing element 170, which may reduce power consumption and load at the optical component 300 (e.g. an OLT switch) to which the upper passive optical routing element connects, since inter-group communication does not need to be routed via the upper passive optical routing element 170 and the optical component 300. In some embodiments according to the arrangement of FIG. 5, the upper passive optical routing element 170 may be an AWGR.

The inter-group communication path is via the respective lower passive optical routing elements 120a-d associated with the servers 110a-d to which the transmitting and receiving servers belong, and via one or more intermediate passive optical routing element 540a-b. The arrangement of FIG. 5 shows two intermediate passive optical routing elements 540a-b; these may route optical signals from a plurality of input ports to a plurality of output ports, with the output depending on the wavelength of the input signal and the input port that received the input signal. The intermediate passive optical routing element 540a-b may be an AWGR, for example.

The intermediate passive optical routing elements 540a-b may be connected to the lower passive optical routing elements 120a-d via respective connecting elements, illustrated schematically by connecting elements 530a-d in FIG. 5. Traffic (optical signals) from the groups of servers 110a-d is an output port of the lower passive optical routing element 120a-d (e.g. a star coupler) connected to the inputs of the intermediate passive optical routing elements 540a-b (e.g. AWGRs). The traffic from the groups of servers 110a-d may be blocked from going through the other star coupler port connected to the outputs of the intermediate passive optical routing elements 540a-b by placing a passive isolator 550a-d at the port.

In the embodiment of FIG. 5, each server (e.g. a network interface card of the server) has an array of fixed, tuned receivers and a tunable laser for wavelength detection and selection. In other embodiments a multiwavelength source other than a laser may be used, such as a spectrum sliced LED. The arrangement of FIG. 5 makes use of four wavelengths, and so the receivers are arranged to receive at least four distinct wavelengths, and the tunable laser is arranged to output signals of at least four distinct wavelengths.

In the arrangement of FIG. 5, four groups of servers 110a-d are connected via two intermediate passive optical routing elements 540a-b. In this example, each intermediate passive optical routing element 540a-b receives an input from two of the groups of servers 110a. More specifically, the first intermediate passive optical element 540a receives input from the first 110a and second 110b groups of servers, via the respective lower passive optical routing elements 120a, 120b. In FIG. 5, the input from the first group of servers 110a is received at the first input port i1 of the first intermediate passive optical routing element 540a, and the input from the second group of servers 110b is received at the fourth input port i4 of the first intermediate passive optical routing element 540a. Similarly, the second intermediate passive optical routing element 540b receives inputs from the third 110c and fourth 110d groups of servers, via the respective lower passive optical routing elements 120c, 120d, at the second i2 and fourth i4 input ports, respectively.

Each of the first and second intermediate passive optical routing elements 540a,b also receives input from the upper passive optical routing element 170, specifically at the second i2 and third i3 input ports, respectively. Each of the first and second intermediate passive optical routing element 540a-b also receives an input from the other intermediate passive optical routing element 540a-b. Specifically, the first intermediate passive optical routing element 540a receives input from the second intermediate passive optical routing element 540b at the third input port i3, and the second intermediate passive optical routing element 540b receives input from the first intermediate passive optical routing element 540a at the first input port i1.

Accordingly, in the embodiment of FIG. 5, each group of servers is connected to an input port of one of the intermediate passive optical routing elements 540a-b. Furthermore, the upper passive optical routing element 170 is connected to the input port of each of the intermediate passive optical routing elements 540a-b. The intermediate passive optical routing elements 540a-b are each connected to an input port of another of the intermediate passive optical routing elements 540a-b.

In the arrangement of FIG. 5, each intermediate passive optical routing element 540a-b has respective input ports connected to two groups of servers 110a-d, an input port connected to the upper passive optical routing element 170 and an input port connected to another of the intermediate passive optical routing elements 540a-b.

Each intermediate passive optical routing element 540a-b has two output ports connected to groups of servers 110a-d; the groups of servers 110a-d connected to the output ports being different from the groups of servers 110a-d connected to the input ports. Each intermediate passive optical routing element 540a-b also has an output port connected to the upper passive optical routing element 170 and one output port connected to another of the intermediate passive optical routing elements 540a-b.

In the embodiment of FIG. 5, the first intermediate passive optical routing element 540a has output ports o1, o4 respectively connected to the third 110c and fourth 110d groups of servers (different from the first 110a and second 110b groups of servers connected to the input ports of the first intermediate passive optical routing element 540a.) The first intermediate passive optical routing element 540a also has an output port o3 connected to the upper passive optical routing element 170 and an output port o2 connected to the second intermediate passive optical routing element 540b.

Similarly, the second intermediate passive optical routing element 540b has output ports o1, o4 respectively connected to the first 110a and second 110b groups of servers (different from the third 110c and fourth 110d groups of servers connected to the input ports of the second intermediate passive optical routing element 540b.) The second intermediate passive optical routing element 540b also has an output port o3 connected to the upper passive optical routing element 170 and an output port o2 connected to the first intermediate passive optical routing element 540a.

Figure 6:
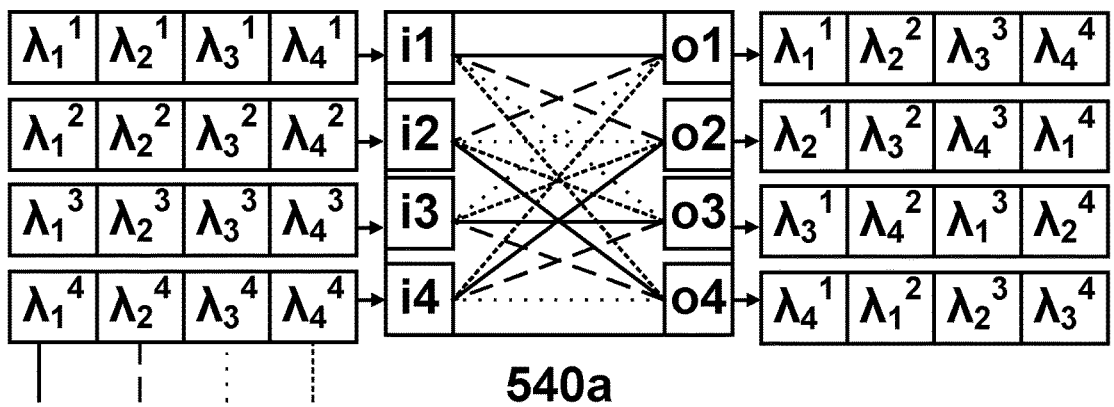
FIG. 6 illustrates routing by passive optical routing elements suitable for use in embodiments according to FIG. 5.
Figure 6:
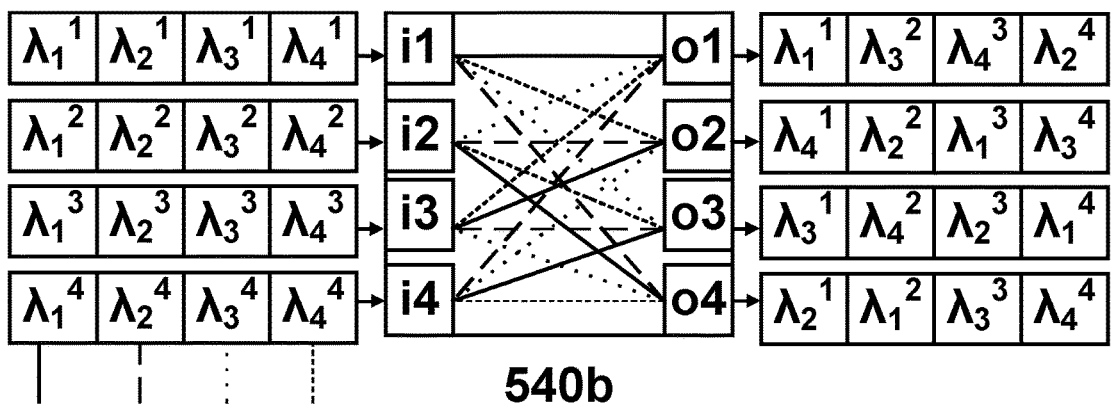

FIG. 6 illustrates the routing of input signals to output ports in the first and second intermediate passive optical routing elements 540a-b in the arrangement of FIG. 5.

FIG. 6 shows the wavelengths input to respective ports, and the corresponding output. The subscript indicates the wavelength, and the superscript indicates the input port. Note that the input ports of the second intermediate passive optical routing element 540b are shown to the left in FIG. 6, but are to the right in FIG. 5. The schematic path of the signals through the intermediate passive optical routing elements 540a, 540b are shown by lines connecting the inputs and outputs. Different line styles are used to represent each wavelength, with $\lambda_1$ being shown by a solid line, $\lambda_2$ being shown by a dashed line, $\lambda_3$ being shown by a dotted line, and $\lambda_4$ being shown by a line with short, dense dashes. The line style representing each wavelength is indicated beneath the input column corresponding to that wavelength in FIG. 6.

The signals at each output port depend on the wavelength of the signal (subscript) and the input port at which the signal was received (superscript). For example, a signal of wavelength 1, received at input port i1 of the first intermediate passive optical routing element 540a is denoted $\lambda_1^1$ and is output at output port o1. Similarly, a signal of wavelength 2, received at input port i3 is denoted $\lambda_2^3$ and is output at output port o4. According to the arrangement of FIG. 6, each output port is associated with four different input signals, with each input signal representing a specific, unique, combination of wavelength and input port. Each output port, is associated with one signal from each of the input ports, with each signal being associated with a different wavelength, such that each of the four signals at the output port is at a different wavelength and associated with a different input port from the other signals at that output. As a result of this, for any output port, there are no repeated subscripts and no repeated superscripts in associated output signals.

For each input port in FIG. 6, input signals of the four different wavelengths (or equivalently, frequencies) are routed to respective, different output ports.

The arrangement in FIGS. 5 and 6 permits n+1 signal destinations to be addressed using only n different wavelengths, where n is 4 in the present example. This is possible as the source of the signal does not need to address itself. Here, the sources and destinations of the signals are considered to be the groups of servers 110a-d and the upper passive optical routing element 170 (or the upper optical communication path 180 and optical component 300, beyond the upper passive optical routing element 170).

For example, in order to send a signal from the first group of servers 110a to the second group of servers 100b, the transmitting server in the first group 110a should tune to wavelength 2. This will be received, via the first lower passive optical routing element 120a, at the first input port i1 of the first intermediate passive optical routing element 540a, corresponding to $\lambda_2^1$. As can be seen from FIG. 6, this is output from output port o2 of the first intermediate passive optical routing element 540a, and is then routed to input port i1 of the second intermediate passive optical routing element 540b, corresponding to $\lambda_2^1$. The signal is then output from output port o4 of the second intermediate passive optical routing element 540b, and is then passed to the second group of servers 110b, via the second lower optical routing element 120b.

As a further example, a server in the first group 110a may communicate with optical component 300 by tuning to wavelength 3. This will be received by the first intermediate passive optical routing element 540a at input port i1, corresponding to $\lambda_3^1$, and will emerge from output port o3. From the output o3, the signal is routed to the upper passive optical routing element 170, and on to the optical component 300 via upper optical communication path 180.

Table 1 illustrates the wavelengths used to send a signal from a source to a destination according to the arrangement of FIGS. 5 and 6. Bold underline is used to indicate a route that passes through both the first and second intermediate passive optical routing elements 540a-b. In this embodiment, each inter-group path includes at least one of the intermediate passive optical routing elements 540a-b. Further, in this embodiment, the route passes through both intermediate passive optical routing elements 540a-b only when the source and destination are groups of servers 110a-d that are both connected to inputs of the same intermediate passive optical routing element 540a-b (e.g. the first and second groups of servers 110a, 110b are both connected to inputs of the first intermediate passive optical routing element 540a, and signals from the first group of servers 110a to the second group of servers 110b, or vice versa, pass through both intermediate passive optical routing elements 540a-b.)

TABLE 1

|        |      | Destination |      |      |      |     |
|--------|------|------|------|------|------|-----|
|        |      | 110a | 110b | 110c | 110d | 170 |
| Source | 110a |      | _2_ | 1 | 4 | 3 |
|        | 110b | _1_ |      | 4 | 3 | 2 |
|        | 110c | 3 | 1 |      | _2_ | 4 |
|        | 110d | 2 | 4 | _3_ |      | 1 |
|        | 170  | 4 | 3 | 2 | 1 |     |

The optical paths between the respective lower passive optical routing element 120a-d and the upper passive optical routing element 170 are referred to as lower optical communication paths 130a-d. In FIG. 5 the portion of the lower optical communication paths 130a-d closest to the corresponding lower passive optical routing element is labeled, but the paths also includes the intermediate passive optical routing elements 540a-b (in the embodiment of FIG. 5, one intermediate passive optical routing element 540a-b is present in each lower optical communication path 130a-d), as well as connections and intermediate optical elements between the lower passive optical routing element 130a-d, the intermediate passive optical routing element 540a-b and the upper passive optical routing element 170. Accordingly, some elements, such as the intermediate passive optical routing elements 540a-b may be shared between two or more lower optical communication paths 130a-d.

Arrangements according to FIG. 5 may provide a respective communication path between each group of servers 110a-d and the upper passive optical routing element 170. Where the optical component 300 connected hierarchically above the upper optical routing element 170 is an OLT card or similar switching component, an additional inter-group communication path may be provided via the upper passive optical routing element 170 and the optical component 300. Thus, in some embodiments, inter-rack communication may be provisioned either via optical component 300 (e.g. an OLT switch) or directly through the intermediate passive optical routing element(s) where a wavelength is selected for transmission based on the location of the destination server. Alternative routes (e.g. via an OLT switch) facilitate multi-path routing and load balancing at high traffic load, which can be advantageous in spite of the delay and power consumption associated with routing via an OLT switch.

In the arrangement of FIG. 5, the upper passive optical routing element 170 may be an AWGR.

A MAC may be provided to assign resources to the servers of the server groups 110a-d, in order to avoid collisions in the intermediate passive optical routing elements 540a-b.

Intra-group communications may be facilitated by any suitable method. Passive methods provide lower power consumption, but non-passive methods may also be used. The arrangements described in relation to FIGS. 3a, 3b and 3c may be used for intra-group communication in the arrangement of FIG. 5.

Where the optical component 300 is an OLT switch, for example, connected to other optical networks, the wavelengths may be reused between the passive networks, since the optical signals in a first network connected to a first OLT port will not be passed directly to a second network connected to a second OLT port.

In some examples according to the embodiment of FIG. 5, each group of servers 110a-d may be a rack or servers.

Figure 7A:
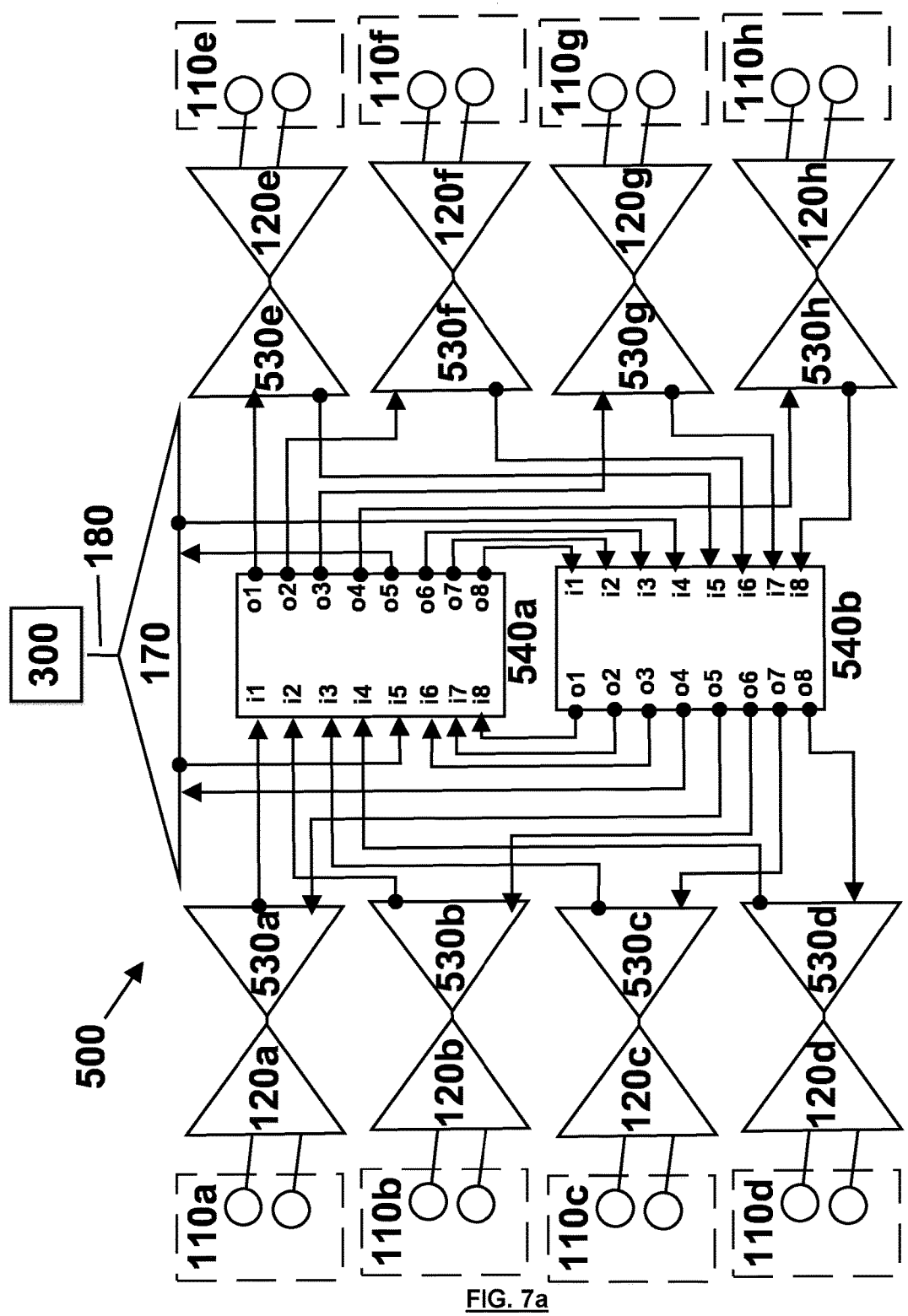
FIG. 7a illustrates a network, or sub-network according to some embodiments.
Figure 7B:
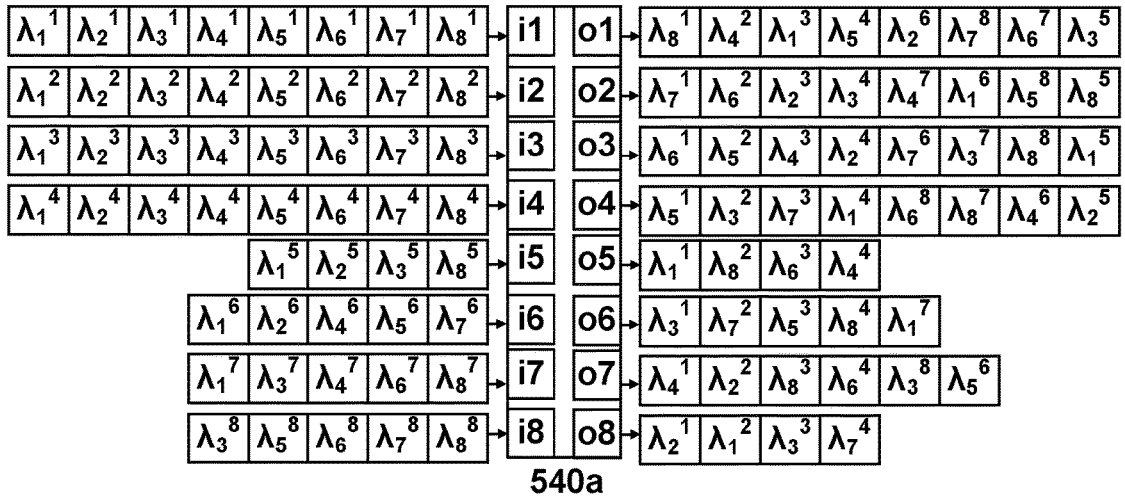
Figure 7B:
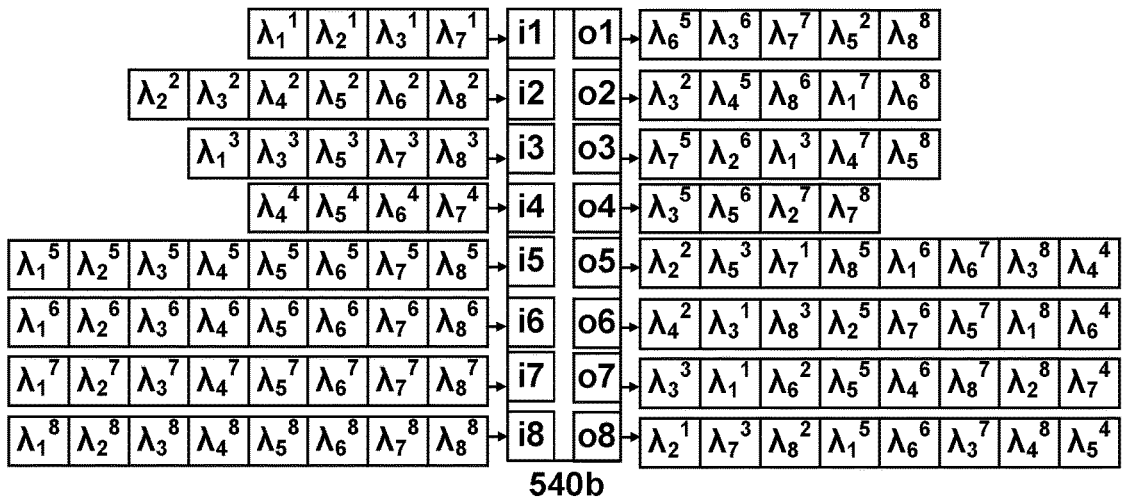

The description of FIGS. 5 and 6 relates to a specific embodiment having four distinct wavelengths, four groups of servers 110a-d and two intermediate passive optical routing elements 540a-b. However, other arrangements are possible having more or fewer wavelengths, groups of servers 110a-d and/or intermediate passive optical routing elements 540a-b. Similarly, the number of input and output ports of the intermediate passive optical routing elements 540a-b may be greater than four or less than four, and may differ between intermediate passive optical routing elements 540a-b. FIGS. 7a and 7b illustrate an embodiment using additional wavelengths and having additional servers.

FIG. 7a illustrates a network in which each server is arranged to use eight distinct wavelengths to allow communication between servers in eight groups of servers 110a as well as an upper passive optical routing element 170. The components are similar to those in FIG. 5, and are not described again here in detail. The routing of signals between groups in FIG. 7a may be achieved using only passive optical routing elements.

As in FIG. 5, the arrangement of FIG. 7a includes two intermediate passive optical routing elements 540a-b, each of which has eight input ports (labeled i1 to i8) and eight output ports (labeled o1 to o8). The first intermediate passive optical routing element 540a has four input ports connected with four respective groups of servers 110a-d, one input port connected with the upper passive optical routing element 170 and three input ports connected with output ports of the second intermediate passive optical routing element 540b. The first intermediate passive optical routing element 540a has four output ports connected with four respective groups of servers 110e-h, different from the groups of servers 110a-d connected to the input ports, one output port connected with the upper passive optical routing element 170 and thee outputs connected with inputs of the second intermediate passive optical routing element 540b.

The second intermediate passive optical routing element 540b is arranged similarly to the first intermediate passive optical routing element 540a, with four input ports connected with respective groups of serves 110e-h (the groups of servers connected with output ports of the first intermediate passive optical routing element 540a), and four output ports connected with respective groups of serves 110a-d (the groups of servers connected with input ports of the first intermediate passive optical routing element 540a). The second intermediate passive optical routing element 540b also has one input and one output connected with the upper passive optical routing element 170 and three inputs and three outputs connected with the first intermediate passive optical routing element 540a.

FIG. 7b illustrates the routing of input signals to output ports in the first and second intermediate passive optical routing elements 540a-b in the arrangement of FIG. 7a.

Similar to FIG. 6, FIG. 7b shows the wavelengths input to respective ports, and the corresponding output port. The subscript indicates the wavelength, and the superscript indicates the input port. The input ports of the second intermediate passive optical routing element 540b are shown to the left in FIG. 7b, but are to the right in FIG. 7a.

Table 2 illustrates the wavelengths used to send a signal from a source to a destination according to the arrangement of FIGS. 7a and 7b. Bold underline is used to indicate a route that passes through both the first and second intermediate passive optical routing elements 540a-b, bold and double underline indicates a route that passes through the first and second intermediate passive optical routing elements 540a-b more than once. In this embodiment, each inter-group path includes at least one of the intermediate passive optical routing elements 540a-b. Further, in this embodiment, the route passes through both intermediate passive optical routing elements 540a-b only when the source and destination are groups of servers 110a-h that are both connected to inputs of the same intermediate passive optical routing element 540a-b (e.g. the first and second groups of servers 110a, 110b are both connected to inputs of the first intermediate passive optical routing element 540a, and signals from the first group of servers 110a to the second group of servers 110b, or vice versa, pass through both intermediate passive optical routing elements 540a-b.)

TABLE 2

| | | Destination | | | | | | | | |
|---|---|---|---|---|---|---|---|---|---|---|
| | | 110a | 110b | 110c | 110d | 110e | 110f | 110g | 110h | 170 |
| Source | 110a | | 2 | 3 | 2 | 8 | 7 | 6 | 5 | 1 |
| | 110b | 2 | | 1 | 7 | 4 | 6 | 5 | 3 | 8 |
| | 110c | 5 | 3 | | 8 | 1 | 2 | 4 | 7 | 6 |
| | 110d | 7 | 8 | 6 | | 5 | 3 | 2 | 1 | 4 |
| | 110e | 8 | 2 | 5 | 1 | | 4 | 7 | 6 | 3 |
| | 110f | 1 | 7 | 4 | 6 | 2 | | 3 | 8 | 5 |
| | 110g | 6 | 5 | 8 | 3 | 7 | 1 | | 4 | 2 |
| | 110h | 3 | 1 | 2 | 4 | 6 | 5 | 8 | | 7 |
| | 170 | 4 | 6 | 7 | 5 | 3 | 8 | 1 | 2 | |

By analogy with FIG. 5, lower passive optical routing elements are indicated by 120a-h, and the connections between the lower passive optical routing elements 120a-h and the intermediate passive optical routing elements 540a-b are labeled 530a-h. For clarity, lower optical communication paths 130 are not shown in FIG. 7a.

As in the embodiment of FIG. 5, passive isolators may be used at the inputs to the lower passive optical routing elements 120a-h, but are not shown in FIG. 7a for clarity.

Figure 8:
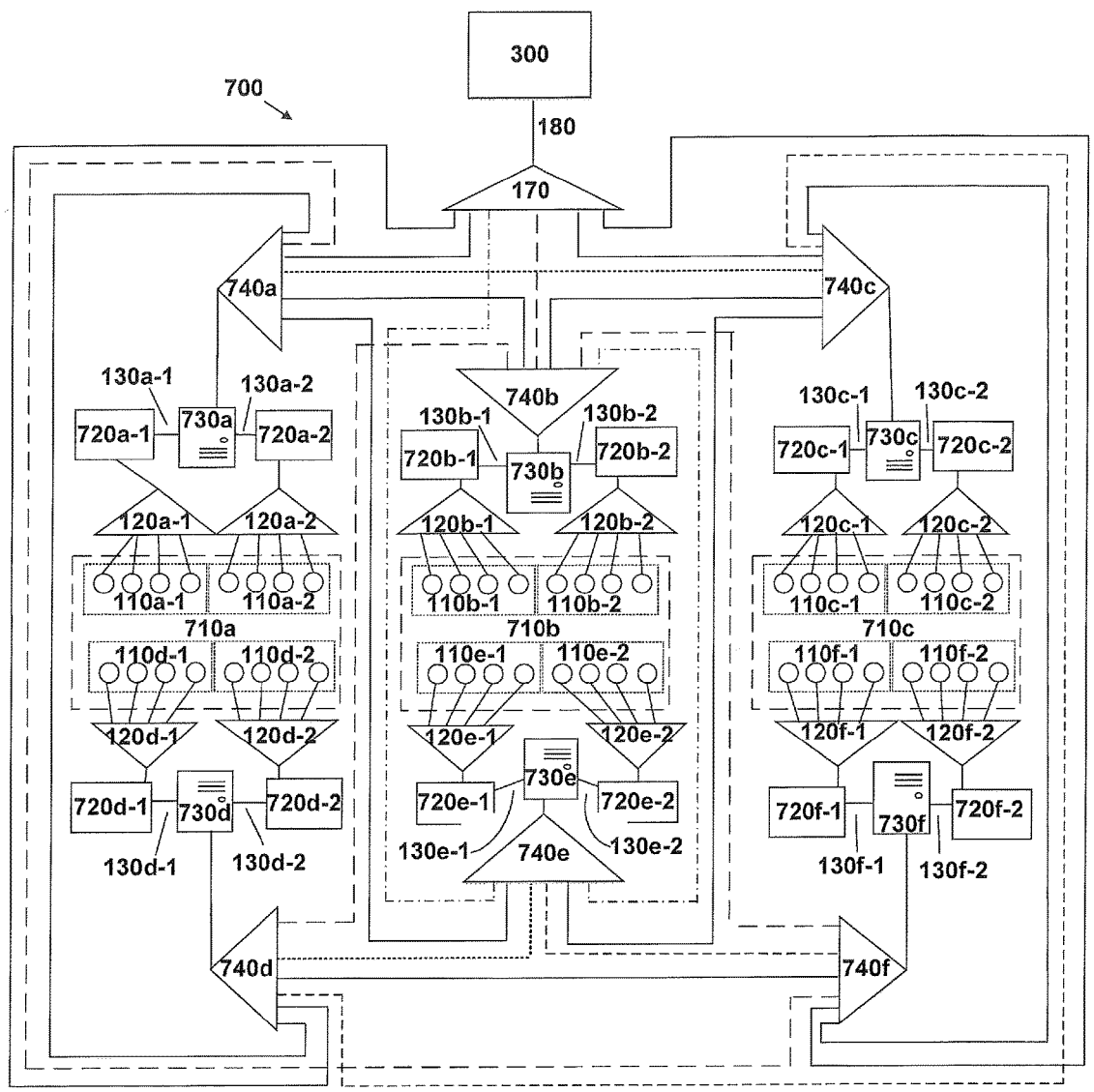
FIG. 8 illustrates a network, or sub-network according to some embodiments.

FIG. 8 illustrates an arrangement 700 according to another embodiment. According to this arrangement illustrated, twelve groups 110a-1, 110a-2, 110b-1, 110b-2, 110c-1, 110c-2, 110d-1, 110d-2, 110e-1, 110e-2, 110f-1, 110f-2 of optical ports for connection to respective servers are provided. Herein, all of these reference signs together is abbreviated 110x-y, such that in the arrangement illustrated in FIG. 8, x∈{a,b,c,d,e,f} and y∈{1,2}. Similar abbreviations are used for other reference signs of FIG. 8. Each group of ports is associated with a corresponding lower passive optical routing element 120x-y. The lower passive optical routing elements 120x-y are connected to routing servers 730x. In the arrangement of FIG. 8, two lower passive optical routing elements 120x-y are connected to (associated with) each routing server 730x. The lower passive optical routing elements 120x-y connected to the same routing server form a set of lower passive optical routing elements 120x-y, and by analogy, the corresponding groups of servers 110x-y form a set of groups of servers 110x-y (also referred to herein as a set of servers).

Between each of the lower passive optical routing elements 120x-y and the associated routing server 730x, a fiber Bragg grating 720x-y (FBG) may be provided (herein a server is "associated" with the routing server 730a to which it is connected via the corresponding lower passive optical routing element 120x, so the servers in groups 110a-1 and 110a-2 are associated with routing server 730a in FIG. 8). As described in relation to FIG. 3b, the FBG reflects light of a particular wavelength (or a narrow range of wavelengths) and allows light of other wavelengths to pass. Light reflected by the FBG is transmitted to each of the servers in the same group as the transmitting server. Accordingly, the FBG allows intra-group communication without use of the routing server 730x (i.e., without routing the signal via the routing server 730x), which may reduce the burden on the routing server 730x.

As the wavelength reflected by FBG 720x-y is received only by the servers in the same group as the originating server, and does not propagate out of the group or into other groups, the same wavelength may be used for all of the groups. This allows a simplified and unified design of the transceivers for all of the servers. The same wavelength may be used for transmitting and receiving as it is a one-way communication for the reflected wavelength.

Alternative arrangements may be used for intra-group communication, such as the arrangements described in relation to FIG. 3a or 3b. Where optical element 300 is a switching element, intra-group communication may additionally or alternatively be routed via the upper passive optical routing element 170 and optical element 300. However, this would increase the burden on the optical element 300, and would increase traffic on the network between the lower passive optical routing element 120x and the upper passive optical routing element 170.

For inter-group communication, a server sends a message to the associated routing server 730x to gain permission to use the inter-group communication wavelength, in order to avoid collision and manage contention on channel access. The routing server 730x receives control messages from servers with which it is associated. The control messages specify the destination that the server sending the control message wants to connect to. The routing server 730x is equipped with a tunable transmitter to connect to the upper passive optical routing element 170, other groups of servers 110x-y (via the routing server 730x associated with the destination group of servers 110x-y). The routing server may also pass signals between groups of servers 110x-y with which it is associated (e.g. routing server 730a may pass signals between servers in groups 110a-1 and 110a-2).

Inter-group communication is achieved by a server sending a signal to the routing server 730x associated with that server's group via the lower passive optical routing element 120x, and FBG 720x-y. The signal is sent at a wavelength that is transmitted by the FBG 720x-y, in order to arrive at the routing server 730x. The routing server receives the signal and retransmits it (possibly with changes, e.g. to headers or address fields, etc.) to an intermediate passive optical routing element 740x associated with the routing server 730x. The intermediate passive optical routing element 740x may route signals received from the routing server 730a based on the wavelengths of the signals. The intermediate passive optical routing element 740x may be an AWGR.

In the arrangement of FIG. 8, each routing server 730x has one associated intermediate passive optical routing element 740x, but in other embodiments each routing server may be associated with a plurality of intermediate passive optical routing elements 740x, or multiple routing servers 730x may be associated with a single intermediate passive optical routing element 740x.

Each of the intermediate passive optical routing elements 740x is connected to each other intermediate passive optical routing element 740x, and in addition is connected to the upper passive optical routing element 170. In FIG. 8 connections between intermediate passive optical routing elements 740x and the upper passive optical routing element 170 are shown using different line styles to improve clarity: the use of different line styles does not have any particular significance. A signal received by an intermediate passive optical routing element 740x from an associated routing server 730x is routed based on the wavelength of the signal. Accordingly, in the arrangement of FIG. 8, each routing server is provided with a tunable laser capable of producing signals of at least six distinct wavelengths, with each wavelength being routed differently by the associated intermediate passive optical routing element 740x.

The signal transmitted by a first intermediate passive optical routing element 740x is received by either another intermediate passive optical routing element 740x or the upper passive optical routing element 170.

Where the destination of the signal is the upper optical communication path 180 and optical element 300, the routing server 170x determines a wavelength associated with the upper passive optical routing element 170 and transmits a signal at that wavelength, via the associated intermediate passive optical routing element 740x to the upper passive optical routing element 170, and on to the upper optical communication path 180 and the optical element 300. For example, for communication between a server in a first group 110a-1 and the upper optical communication path 180, the lower optical communication path 130a-1 is between the lower passive optical routing element 120a-1 and the upper passive optical routing element 170 and includes the routing server 730a and the intermediate passive optical routing element 740a. In some embodiments according to the arrangement of FIG. 8, the upper passive optical routing element 170 may be an AWGR.

Where the destination of the signal is a server in a different set from the transmitting server, the transmitting server sends the signal to its associated routing server 730x, via the associated lower passive optical routing element 720x-y. The routing server 730x then determines a wavelength associated with the set of the destination server and transmits a signal at that wavelength via its associated intermediate passive optical routing element 740x to the passive optical routing element 740x associated with the set of the destination server. The signal is then provided to the routing server 720x associated with the set of the destination server. That routing server 720x then determines the group 110x-y of the destination server, and transmits a signal to the destination server, via the lower passive optical routing element 720x-y associated with the group 110x-y of the destination server.

For example, if the transmitting server is in a first group 110a-1 and the destination server is in a second group 110b-1, the transmitting server sends a signal to the associated first routing server 730a via the associated first lower passive optical routing element 120a-1. The routing server 730a determines that the destination server is in the set associated with second routing server 730b and determines the wavelength required to send signals to second intermediate passive optical routing element 740b. A signal of that wavelength is sent to the first intermediate passive optical routing element 740a, which routes the signal, based on wavelength to the second intermediate passive optical routing element 740b, which routes the signal to the second routing server 730b, which determines the destination server is in the second group 110b-1, and transmits a signal to the second group 110b-1 via the second lower passive optical routing element 120b-1.

Where the destination of the signal is a server in a different group, but the same set as the transmitting server, the transmitting server sends the signal to its associated routing server 730x, via the associated lower passive optical routing element 720x-y. The routing server 730x then determines the group 110x of the destination server and transmits a signal to the lower passive optical routing element 120x-y associated with the group 110x-y of the destination server. For example, where the transmitting server is in group 110a-1 and the destination server is in group 110a-2, the transmitting server sends a signal to the associated first routing server 730a via the associated first lower passive optical routing element 120a-1. The routing server 730a determines that the destination server is in the group 110a-2 and transmits a signal to the servers of group 110a-2 via the associated lower passive optical routing element 120a-2.

Each of the routing servers 730x may maintain a database of server's addresses in the groups and/or sets, and the wavelength assigned to each set, to facilitate sending a signal to a routing server 730x associated with another set of servers. The routing servers 730x may perform wavelength conversion to facilitate inter-rack communication. Inter-rack communication may take place passively (between routing servers 730x) via the intermediate passive optical routing elements 740x, since full mesh connectivity exists between the routing servers 730x in the arrangement of FIG. 8. Alternatively, inter-rack communication may be performed via optical element 300, where optical element 300 is a switching element, such as an OLT switch. Accordingly, redundant routing may be provided, and may ameliorate problems associated with congestion or failure of parts of the network.

According to some embodiments, each routing server 730x is arranged to generate, for each destination (i.e. another routing server or the upper passive optical routing element) a corresponding wavelength, with the wavelengths associated with each destination being different. Each destination is to receive signals from each of the other signal sources (i.e. other routing servers or the upper passive optical routing element). The wavelengths of the signals received at a destination are distinct for of each of the sources. Table 2 illustrates an example of wavelength assignment for use between sources and destinations in the arrangement of FIG. 8, where six wavelengths are used for communication between the seven sources and seven destinations, with these wavelengths indicated as 1, 2, 3, 4, 5 and 6. Other wavelength assignments are also possible. Moreover, additional wavelengths may be used.

TABLE 2

| | | Destination | | | | | | |
|---|---|---|---|---|---|---|---|---|
| | | 730a | 730b | 730c | 730d | 730e | 730f | 170 |
| Source | 730a | | 1 | 2 | 3 | 4 | 5 | 6 |
| | 730b | 6 | | 1 | 2 | 3 | 4 | 5 |

TABLE 2-continued

| | Destination | | | | | | |
|---|---|---|---|---|---|---|---|
| | 730a | 730b | 730c | 730d | 730e | 730f | 170 |
| 730c | 5 | 6 | | 1 | 2 | 3 | 4 |
| 730d | 4 | 5 | 6 | | 1 | 2 | 3 |
| 730e | 3 | 4 | 5 | 6 | | 1 | 2 |
| 730f | 2 | 3 | 4 | 5 | 6 | | 1 |
| 170 | 1 | 2 | 3 | 4 | 5 | 6 | |

As can be seen, in the arrangement of FIG. 8, the communication path for inter-group communications between servers in different sets is via two intermediate passive optical routing elements 740x. For inter-group communication between two servers in the same set, the communication path is via the routing server 730x associated with that set, but does not include any of the intermediate passive optical routing elements 740x. For communication between a server and the upper passive optical routing element 170, the communication path includes one intermediate passive optical routing element 740x. For intra-group communication, the communication path does not include any of the intermediate passive optical routing elements 740x or any of the routing servers 730x.

Each group of servers 110x-y may be assigned two wavelengths, one for uplink and one for downlink transmissions between the servers of the group and the routing server 730x associated with the group 110x-y. The routing servers may maintain a database of servers' addresses in the groups and wavelengths assigned to each group. In some examples, each server may maintain a database of the servers in the groups 110x-y with which the routing server 730x is associated, in addition, the server may maintain a database of the sets in which other servers are located, such that signals may be sent to the routing server 730x associated with the set of the destination server, and the routing server 730x associated with that set may be responsible for identifying the correct group and forwarding the signal to the correct group 110x-y.

In some examples, servers in the groups of servers 110x-y may use the same pair of wavelengths for communication between the server and the associated routing server 730x, as servers in other sets. This may improve uniformity between the groups of servers 110x-y, and may lead to efficient use of available wavelengths. In some examples, the routing server 730x-y may have a different port for each group of servers 110x-y with which it is associated, an in this case, communication between the groups of servers 100x-y and the routing server may use the same pair of wavelengths in each group 110x-y within the set of groups associated with that routing server 370x, since the networks between the routing server 370x and each group of servers 110x-y are optically separated (i.e. optical signals do not propagate from one such network to another).

In some embodiments, the routing servers may periodically exchange updates and status of their connectivity to update their databases. Such updates may be exchanged between routing servers 730x using the communication paths described above, either using or avoiding the upper passive optical routing element 170.

Each routing server may be provided with distinct uplink (outgoing) and downlink (incoming) communication paths. The uplink and downlink communication paths may have similar or substantially the same arrangements. For example, the intermediate passive optical routing elements 740x may include two AWGRs, one for uplink communication and one for downlink communication.

The sets of servers may also be arranged in supersets, and the arrangement of FIG. 8 shows supersets 710a, 710b, 710c each having two sets of servers (i.e. four groups of servers 110x-y). In the arrangement of FIG. 8 arranging the servers in supersets 710a, 710b, 710c does not influence the connections between the servers and groups of servers on a schematic level, but may be convenient for physically arranging the servers. For example, each superset may correspond to a rack of servers. Where the sets of servers are arranged in supersets, the number of sets in each superset is not particularly limited.

In the arrangement of FIG. 8, each set of servers includes two groups of servers 110x-y, but more or fewer groups of servers may be included in each set.

Embodiments according to the arrangement of FIG. 8 may allow a reduction in the number of tunable lasers by using a routing server 730x to manage inter-group communication.

Each group 110x-y, for the purposes of intra-group communication, may be a TDM PON including N servers, where N is the splits ratio for the TDM PON. According to an exemplary embodiment, each group of servers 110x-y may include eight servers, and each set may include two groups 110x-y. Furthermore, each superset may include two sets. In such an arrangement, the superset includes 32 servers. Where a superset to with a rack, each rack would include 32 servers.

In another example, the number of groups in each set may be two, and the supersets have only one set each (i.e. the set and superset are the same). Where each group has 18 servers, the result would, again, be a superset of 32 servers, with only one routing server 730x associated with each superset. Again, where the superset corresponds to a rack, the result would be a rack of 32 servers. Relative to an example with two sets in each superset and four servers in each group, this arrangement may lead to a reduction in wiring complexity and the number of components, such as the intermediate passive optical routing elements, but may lead to an increased load on the routing servers 730x. In other embodiments, each rack may have more or fewer servers.

In some examples, each group has the same number of servers, each set has the same number of groups and each superset has the same number of sets. Such an arrangement improves uniformity in the network. However, in other embodiments the groups sets and supersets may have varying numbers of servers/groups/sets.

In the above examples of the number of servers that may be placed in each group/set/superset, the routing servers 730x were not counted in the total number of servers. The routing servers 730x may be dedicated devices that essentially perform only routing operations. However, in other arrangements the routing servers 730x may perform other functions, and in some embodiments, the routing servers 730x perform similar functions to the servers in the groups 110x-y, in addition to performing the routing functions described above.

According to embodiments of FIG. 8, each server in the groups of servers 110x-y need generate only two wavelengths, one for uplink and one for downlink. This may allow a reduction in cost by not requiring tunable lasers capable of emitting at more than two wavelengths at the servers in the groups 110x-y.

Figure 9:
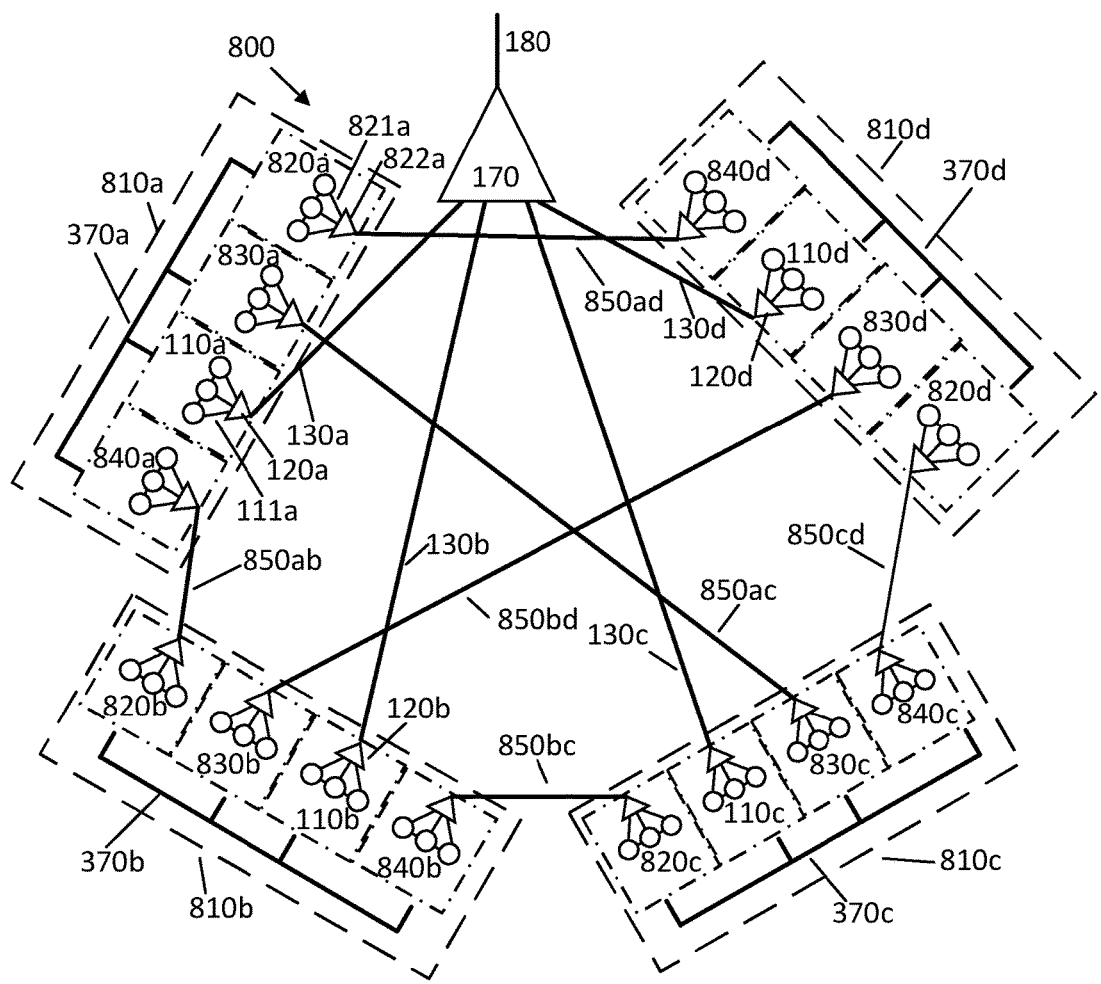
FIG. 9 illustrates a network, or sub-network according to some embodiments.

FIG. 9 shows another embodiment. According to the embodiment of FIG. 9 two or more sets of optical ports/servers 810a-d are provided. Four sets of ports/servers 810a-d are illustrated in FIG. 9. Each set includes two or more groups of ports/servers 110a-d, 820a-d, 830a-d, 840a-d, with four groups in each set in FIG. 9. A first group of servers 110a is provided in the first set of servers 810a. In the arrangement 800 of FIG. 9, three additional sets of servers 820a, 830a, 840a are provided in the first set of servers. Similarly, a second group of servers 110b is provided in the second set of servers 810b. Three additional sets of servers 820b, 830b 840b are also shown in the second set of servers 810b in FIG. 9.

According to the embodiment of FIG. 9, an intra-set communication path 370a-d is provided. The intra-set communication path 370a-d allows communication between any pair of servers within the same set. The pair of servers may be in the same group or in different groups within the same set. The following description assumes that the intra-set communication path 370a-d is an optical backplane, e.g. as shown in FIG. 3c. However, other arrangements are possible; for example intra-set communication may be achieved using the arrangement of FIG. 3a. In some embodiments, the intra-set communication path 370a-d may also be used for intra-group communication. In some embodiments a separate intra-group communication path may be provided. For example, intra-set communication may be performed using an optical backplane (as in FIG. 3c) and intra-group communication may additionally or alternatively make use of a star reflector or FBG (as in FIGS. 3a and 3b).

The first group of servers 110a is optically connected to a first lower passive optical routing element 120a by data connections 111a. The first lower passive optical routing element 120a is connected to an upper passive optical routing element 170 by a first lower optical communication path 130. The upper passive optical routing element 170 is optically connected to an upper optical communication path 180. Accordingly, an optical signal may be transmitted between the upper optical communication path 180 and a server in the first group of servers via data connections 111, first lower passive optical routing element 120a, first lower optical communication path 130 and upper passive optical routing element 170. Similarly, the second group of servers 110b is optically connected to the upper optical communication path 180 by data connections, a second lower passive optical routing element 120b, a second lower optical communication path 130b and the upper passive optical routing element 170. Similar arrangements are provided connecting the third 110c and fourth 110d groups of servers with the upper optical communication path 180. The groups of servers 110a-d providing a link to the upper optical communication path 180 may be termed herein as externally-linked groups of servers, since they allow for communication with network elements outside of the network cell hierarchically below the upper passive optical routing element 170.

The communication path between each of the externally-linked groups of servers 110a-d and the upper optical communication path 180 may be similar to that described in relation to FIG. 1.

According to some embodiments, the signals to/from the upper passive optical routing element 170 may have the same wavelength, such that the wavelength is not dependent on the group of servers that is the source or destination of the signal. In some arrangements the upper passive optical routing element 170 may be a star coupler and/or a star splitter. TDM may be used to carry signals between the upper optical communication path 180 and the externally-linked groups servers 110a-d. According to such an arrangement, two wavelengths may be used, one for uplink from the servers and one for downlink to the servers, with the same wavelengths being used for all of the sets of servers 810a-d.

According to some embodiments, signals received by the upper passive optical routing element 170 may have a wavelength dependent on the group of externally-linked servers 110a-d that transmitted the signal. That is, each externally-linked group of severs may use a different wavelength of light when sending signals to the upper passive optical routing element 170. Similarly, signals arriving at the upper passive optical routing element 170 from the upper optical communication path 180 may have a wavelength dependent on the destination group of servers 110a-d. In some arrangements the upper passive optical routing element 170 may passively route signals based on the wavelength of the signal. In some embodiments, the upper passive optical routing element 170 may be an AWGR. In such an arrangement WDM may be used to carry signals between the upper optical communication path 180 and the externally-linked groups servers 110a-d. This may lead to an increase in available bandwidth. According to this arrangement two distinct wavelengths may be used for each set 810a-d (8 wavelengths in the arrangement of FIG. 9), with one wavelength being used for uplink and one for downlink, for each set 810a-d. According to some embodiments, some externally-linked groups of servers 110a-d may make use of the same wavelength when communicating via the upper passive optical routing element 170, while other externally-linked groups of servers 110a-d may make use of different wavelengths, that is, some wavelengths may be shared between externally-linked groups 110a-d. In such embodiments, a hybrid of WDM and TDM may be used.

The first lower passive optical routing element 120a may combine signals from each of the servers in the first group 110a and route the signals along the first lower optical communication path 130a. The first lower passive optical routing element 120a may be a star coupler. Similarly, signals received by the first lower passive optical routing element 120a from the first lower optical communication path 130a may be routed to each server in the first group of servers 110a, and in some embodiments, the first lower passive optical routing element 120a may be a star splitter. The second, third and fourth lower passive optical routing elements 120b-d may be similar to the first lower passive optical routing element 120a.

According to some arrangements, the communication between a server in the first, second, third or fourth groups of servers 110a-d and the upper optical communication path 180 may be entirely passive.

According to the arrangement of FIG. 9, one group of servers 110 a-d in each set of servers 810a-d has a communication path to/from the upper optical communication path 180. The other groups of servers 820a-d, 830a-d, 840a-d (referred to herein as set-linking groups) provide inter-set communication paths 850ab, 850ac, 850ad, 850bc, 850bd, 850cd (collectively referred to herein as 850xy).

Each set-linking group 820a-d, 830a-d, 840a-d is optically connected with another set-linking group 820a-d, 830a-d, 840a-d in a different set of servers 810a-d. For example, set-linking group 820a in the first set of servers 810a is linked to set-linking group 840d in the fourth set of servers 810d. The connection between servers in these set-linking groups is via data connections 821a, set-linking passive optical routing element 822a (associated with group of servers 820a), an inter-set optical communication path 850ad, another set-linking passive optical routing element (associated with group of servers 840d), and data connections between the individual servers of group 840d and the set-linking passive optical routing element associated with group 840d. Accordingly, the set-linking group 820a is linked with set-linking group 840d. The communication between pairs of linked set-linking groups may be passive optical communication.

Similarly, in the arrangement of FIG. 9, set-linking group 830a in the first set of servers 810a is liked with the set-linking group 830c in the third set of servers 810c, and the set-linking group 840a of the first set of servers 810a is linked with set-linking group 820b in the second set of servers 810b.

The arrangement of the data connections and set-linking passive optical routing elements in the set-linking groups of servers may be similar to the arrangement of the data connections 111a and lower passive optical routing element 110a of the first group of servers 110a, with the inter-set communication paths 850xy connecting a pair of set-linking passive optical routing elements in different sets, rather than connecting a lower passive optical routing element 120a-d and an upper passive optical routing element 170. The set-linking passive optical routing elements 822a may be star couplers.

According to some embodiments, for any pair of sets of servers 810a-d, there is at least one set-linking group 850xy in each set 810a-d of the pair of sets 810a-d that are linked, such that a respective link exists for each pair of sets of servers 810a-d.

According to the arrangement of FIG. 9, each set of servers 810a-d is linked to each other set of servers 810a-d, via a respective inter-set communication path 850xy and a respective pair of set-linking groups associated with the inter-set communication path 850xy. According to some embodiments an alternative path for inter-set communication may be provided via a switching element connected to the upper communication path 180.

According to the arrangement of FIG. 9, communication from the first group of servers 110a in the first set 810a and the second group of servers in the second set 810b may be performed by the transmitting server in the first group 110a sending a signal via the intra-set communication path 370a to a server in the set-linking group of servers 840a in the first set 810a that is linked to the second set 810b (i.e. a set-linking group 820b in the second set). The signal is received by a server in group 840a and that server retransmits the signal to a server in group 820b of the second set via the inter-set communication path 850xy. The signal is sent via the data connection and set-linking passive optical routing element associated with that group 840a, inter-set communication path 850ab, and the linking passive optical routing element and data connections associated with group 820b in the second set of servers 810b. The signal is retransmitted to the destination server in the second group 110b via the intra-set communication path 370b of the second set of servers 810b. Similarly, a signal could be sent from a server in the first group 110a of the first set 810a to any server in any of groups 110b, 820b, 830b or 840b of the second set 810b using a similar method, but altering the addressing over the intra-set communication path 730b of the second set 810b. Where the destination server is in the group 820b, the same routing may be used, but use of the intra-set communication path 370b of the second set 810b may not be needed, where the destination server is able to receive the signal directly from the set-linking passive optical routing element associated with group 820b. A similar approach may be used where the source of the signal is a server in the linking groups 820a or 830a. Where the source of the signal is a server in linking group 840a, the same approach may be used, but it may be unnecessary to make use of the intra-set communication path 370a of the first group. A similar approach may be used to provide a communication path between any pair of servers in any different sets 810*a-d*.

In the arrangement of FIG. 9, the number of groups 110*a-d*, 820*a-d*, 830*a-d*, 840*a-d* in each set 810*a-d* is equal to the number of sets 810*a-b*; there is one externally-linked group 110*a-d* in each set, and the remaining groups are set-linking groups 820*a-d*, 830*a-d*, 840*a-d*. Each set-linking group 820*a-d*, 830*a-d*, 840*a-d* is linked to one other set-linking group 820*a-d*, 830*a-d*, 840*a-d* in a different set 810*a-d*. Inter-set communication from a server that does not have a direct connection with the set 810*a-d* of the destination server, is performed using a server in the set-linking group 820*a-d*, 830*a-d*, 840*a-d* of the same set 810*a-d* as the source server that has a direct connection with the set 810*a-d* of the destination server.

Where a server a receives a signal from another server in the same set and retransmits the signal outside of the set (e.g. to a different set or to the upper passive optical routing element), or vice-versa (where the signal is received from outside the set and is retransmitted to another server within the same set as the retransmitting server), the retransmitting server is acting as a relay. The selection of a relay server from within a group 110*a-d*, 820*a-d*, 830*a-d*, 840*a-d* may be based on the server's utilization or traffic load within the group 110*a-d*, 820*a-d*, 830*a-d*, 840*a-d*.

According to some embodiments, each set of servers may include 4 groups of servers, and each group of servers 110*a-d*, 820*a-d*, 830*a-d*, 840*a-d* may include 8 servers. In some embodiments, each set of servers 810*a-d* may correspond to a rack of servers.

In some embodiments in accordance with FIG. 9, the need for servers to have tunable lasers may be eliminated. In particular, each server may communicate using a single wavelength (for signals transmitted via its associated lower passive optical routing element 120*a-d* or set-linking passive optical routing element). An additional laser may be required for intra-set communication via the intra-set communication path 370*a-d*. According to some embodiments, this additional laser may be a single-wavelength laser. Accordingly, embodiments may lead to a reduced cost by avoiding or reducing the use of expensive tunable lasers.

Embodiments according to the arrangement of FIG. 9 may facilitate high speed interconnection between sets of servers 810*a-d*.

According to some embodiments, the communication path between servers in linked set-linking groups may be an entirely passive optical communication path. According to some embodiments, the communication path between servers in externally-linked groups and the upper passive optical routing element may be entirely passive optical communication.

The embodiment of FIG. 9 includes four sets of servers and four groups of servers in each set, but other arrangements are possible.

According to some embodiments, one or more non-linking groups of servers may be provided in some or all sets. Non-linking groups of servers are arranged to communicate with other groups of servers in the same set via the intra-set communication path 370*a-d*, but are not linked to other sets of servers 810*a-d* or the upper passive optical routing element 170. Servers in non-linking groups may communicate with servers in other sets 810*a-d* or the upper passive optical routing element 170 by routing communications via the intra-set communication path 370*a-d* to a set-linking group or an externally linked group in the same set as the non-linking group.

According to some embodiments, multiple groups within a set may link with the same destination (e.g. another set 810*a-d* or the upper passive optical routing element 180). This may improve redundancy of routing and reduce the effect of congestion, for example.

According to some embodiments some sets are not linked to all sets. For example, in the arrangement of FIG. 9, inter-set communication paths 850*ad*, 850*ac* and 850*bd* may be omitted (the groups of servers 820*a*, 830*a*, 830*b*, 830*c*, 830*d*, 840*d* connected to these communication paths may also be omitted). In this case, communication may be routed via sets in addition to the source and destination set. For example, a signal from group 110*a* in the first set 810*a* to group 110*d* in the fourth set 810*d* may be routed via groups 840*a*, 820*b*, 840*b*, 820*c* and 840*c*, making use of the intra-set communication paths 370*a-d* and the remaining inter-set communication paths 850*ab*, 850*bc*, 850*cd*. Similarly, in some embodiments, one or more sets may have no direct link with the upper passive optical routing element 170, with communication between such sets and the upper passive routing element 170 being routed via a set that has an externally-linked group.

Figure 10:
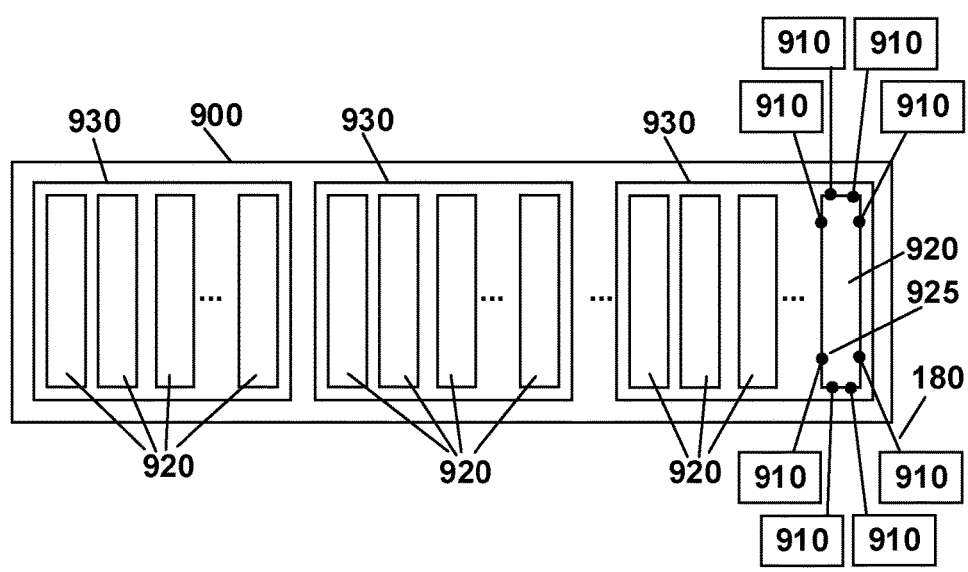
FIG. 10 illustrates a network according to some embodiments.

FIG. 10 illustrates an arrangement according to some embodiments, in particular, FIG. 10 shows a system suitable for use in a data center network, having a number of sub-networks, or cells 910, with at least one of the sub-networks 910 having a structure as described in relation to FIGS. 1 to 9.

In the arrangement of FIG. 10, a plurality of sub-networks 910 are provided. The sub-networks 910 may be optical networks, and may include passive optical networks and/or networks having a hybrid of passive and active components. In FIG. 10, for clarity sub-networks are shown connected to only one OLT card 920. However, sub-networks may be connected to each OLT card 920.

The sub-network 910 may be connected, via upper optical communication path 180, to an OLT port 925 of an OLT card 920. A plurality of OLT cards 920 may be provided in an OLT switch 900. The OLT cards may be arranged in a number of chassis 930, with a plurality of OLT cards 920 in each chassis 930. The OLT cards may be able to communicate with other OLT cards in the same chassis 930, and with OLT cards in other chassis within the same OLT switch 900. Moreover, the OLT switch may also facilitate communication with other OLT switches.

The OLT switch 900 of FIG. 10 may have a similar structure to an OLT switch used in fiber to the home, curb or premises access networks.

According to some embodiments, each OLT card 920 has 8 OLT ports 925, with each OLT port connected to an optical sub-network, or cell 910. Each OLT chassis may contain 16 OLT cards, and an OLT switch may include 8 chassis. In an arrangement having 128 servers in each sub-network, each OLT switch connects 131,072 servers. Accordingly, in such an arrangement, 5 OLT switches is sufficient to connect 655,360 servers.

According to some embodiments, each OLT port may provide a transmission rate of up to 10 Gb/s. With a split ratio of 128, a single such card port can connected 128 servers, and one card may connect 1024 servers. According to such an arrangement, single chassis of 16 OLT cards can provision connection to 16,384 servers.

In some applications, sharing a 10 Gb/s port rate between 128 servers may provide insufficient capacity for some of the servers. In such cases, the architecture may be arranged such that fewer servers share each port's bandwidth. This may require a greater number of OLT cards. At lower activity ratios, the optical network protocol may perform elastic bandwidth allocation to cater for traffic bursts. In some arrangements the data center load may be distributed among different sub-networks for load balancing, or may be consolidated in fewer sub-networks to allow power saving by power shedding, e.g. in response to long term daily load variation, followed by sleep in response to shorter inactivity periods within the hour/minutes.

The arrangement of FIG. 10 may be used to provide large connectivity, and may be suitable for data centers in various applications, such as cloud computing, in order to deliver services such as Infrastructure as a Service (IaaS), Platform as a Service (PaaS), and Software as a Service (SaaS).

The arrangement of FIG. 10 may be used to reduce or eliminate the need for access and aggregation switches, which may lead to a reduction in power consumption. The arrangement of FIG. 10 may also provide good performance in terms of resource allocation and interconnection speed between servers.

Figure 11:
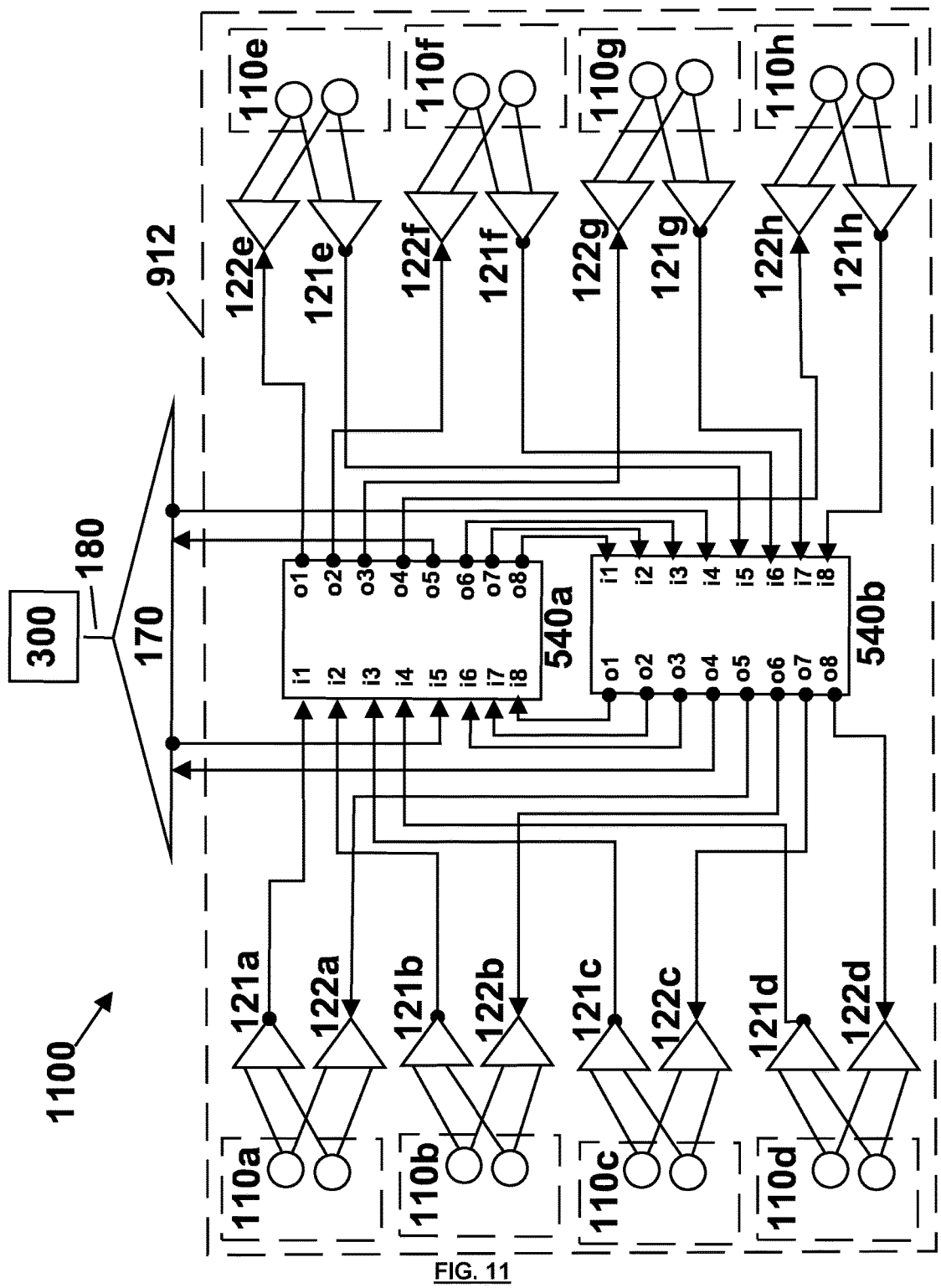
FIG. 11 illustrates a network, or sub-network according to some embodiments.

FIG. 11 illustrates the arrangement of FIG. 7a, but shows an example of the structure of the connecting elements 530. According to the arrangement of FIG. 11, signals from a group of servers 110 to an intermediate passive optical routing element 540 are routed via a uplink lower passive optical routing element 121a-h, and signals from an intermediate passive optical routing element 540 to a group of servers 110 are routed via a downlink lower passive optical routing element 122a-h. Each of the uplink lower passive optical routing element 121a-h may be a star splitter. Each of the downlink lower passive optical routing element 122a-h may be a star coupler. The uplink lower passive optical routing element 121a-h and downlink lower passive optical routing element 122a-h may be considered to be components of the lower passive optical routing element 120a-h.

The routing of input signals to output ports in the first and second intermediate passive optical routing elements 540a-b in the arrangement of FIG. 11 may be as shown in FIG. 7b. This will lead to the routing table of Table 2.

According to some examples according to FIG. 11, each of the eight groups of servers 110a-h may include 8 servers, such that the cell 912 has 64 servers. An example according to the arrangement of FIG. 5 also having 64 servers in the cell 912 would require 16 serves in each of the four groups of servers (assuming the same number of servers in each group). This relatively larger number of groups in the arrangement of FIG. 11 reduces the number of servers competing for resources in each group 110, and so may reduce per wavelength oversubscription for point to point intra cell communication.

A mixed integer linear programming (MILP) model may be used to optimize the interconnections of the passive optical routing elements in the architectures depicted in FIG. 11. According to some examples, the cell 912 consists of 64 servers arranged in 8 groups of servers. FIG. 11 presents fabric interconnection design for a cell 912 with tuneable lasers for 8 groups of servers obtained from the MILP model, FIG. 7b shows the configuration obtained for intermediate passive optical routing elements 540a-b (e.g. AWGRs) interconnection for wavelength routing and assignment, and Table 2 shows the wavelength assignment table for inter-group and group to optical component 300 communications.

According to the wavelength routing table, if a server in the first group 110a is to communicate with a server in the fourth group 110d, a control message is sent to the optical component 300 (e.g. an OLT switch) using wavelength 1 routed through the first intermediate passive optical routing element 540a from input port 1 to output port 5. This output port connects with the optical component 300 (via the upper passive optical routing element 170). If the request is granted, the optical component 300 replies with a control message to the first group of servers 110a and the fourth group of servers 110d using wavelengths 4 and 5, respectively. The destination server in the fourth group 110d tunes its receiver to wavelength 2 to receive data from source server in the first group 110a. Idle servers may, by default, be tuned to wavelengths connecting them with the OLT.

Figure 12:
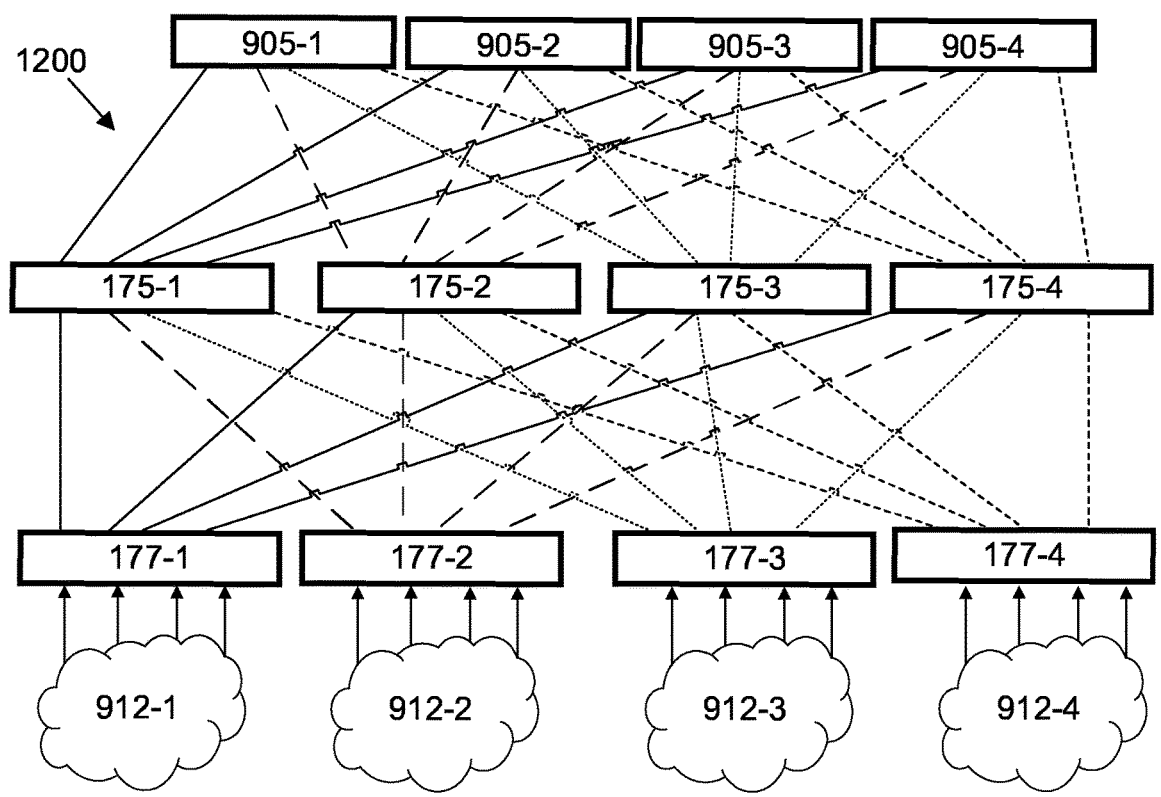
FIG. 12 illustrates a network, or sub-network according to some embodiments.

FIG. 12 illustrates the connection between the groups of servers 110 and the optical element 300 (e.g. an OLT) according to some examples. The connection may be established via 2-tiers of passive routing elements 175, 177 (such as AWGRs) connected as a clos topology. To avoid the complexity associated with showing many links, FIG. 12 shows uplink connections from a cell 912 to a common passive routing element 177 (e.g. upper passive routing element 170) without showing the details of the cell 912. FIG. 12 shows the uplink connections between the lower tier passive optical routing element 177 and the optical element 300; a similar arrangement may be used for downlink connections. The present example assumes that each cell 912 corresponds with the cell 912 shown in FIG. 11, however other cell 912 arrangements may be used, such as any of the other arrangements described in relation to FIGS. 1 to 9. It is noted that the cell 912 differs from cell 910 of FIG. 10 as the cell 912 does not include the upper passive optical routing element 170. The arrangement of FIG. 12 allows provision a rich connectivity. Where the servers are equipped with tuneable lasers, the design is flexible to allow servers to join any OLT port by tuning its transceivers to the proper wavelength.

According to some examples, all communications may be coordinated via the optical element 300 (e.g. an OLT). Servers with demands send a request control message with the destination address and resources requirements to the optical element 300. If the optical element 300 grants the request, it replies with gate messages to the source and the destination servers informing the servers of the wavelength assignment both servers need to tune to and the time slot. Initially, all servers' transmitters and receivers may be tuned to a designated wavelength connecting them with the optical element 300. A network interface card of each server may be equipped with an array of fixed tuned receivers and a tuneable laser for wavelength detection and selection, respectively. The number of fixed tuned receivers for each server in a cell 912 may be governed by the number of groups of servers and number of ports of the optical element 300 connecting the cell 912. The number of input ports to each of the lower tier passive routing elements 177 may be equal to the number of outputs from cell 912. The number of output ports from each of the lower tier passive routing elements 177 may be equal to the number of optical component 300 ports the respective cell 912 is connected to (via the upper tier passive routing elements 175). Each of the upper tier 175 passive routing elements may have a number of input ports equal to the number of optical component 300 ports each cell 912 is connected to. Similarly, each of the upper tier 175 passive routing elements may have a number of input ports equal to the number of optical component 300 ports each cell 912 is connected to. For the particular arrangement illustrated in FIG. 12, 8×8 AWG would be sufficient if we consider a connection to 8 optical component 300 ports and a cell 912 with a maximum of 8 groups of servers.

Within a cell 921, inter-group communication can be provisioned either via the optical component 300 or directly based on an intra-cell communication path (e.g. via the intermediate passive optical routing elements 540*a-b* in the arrangement of FIG. 11) where a wavelength may be selected for transmission based on the location of the destination server. Alternative routes facilitate multi-path routing and load balancing at high traffic loads, however, forwarding traffic through the optical component 300 may be avoided where possible, to reduce delay and power consumption. A server can communicate with servers in other groups 110 by tuning its transceiver to the proper wavelength based on a wavelength routing map. This design is similar to a cellular wireless network, in that wavelengths can be reused to connect other groups of servers 110 connected to different ports of the optical component 300.

The arrangement of FIG. 12 provides flexibility, which may allow servers to join different ports of the optical element 300. This may enhance performance in terms of resources provisioning. However, according to some examples, all servers are equipped with tuneable transceivers, which may increase cost.

Arrangements according to FIG. 12 may be a Wavelength Routing Network (WRN) with N+K entities (N groups of servers 110 and K ports of optical component 300) that are to communicate with each other. For the particular arrangement depicted in FIG. 12, and where each cell 912 is as shown in FIGS. 11, K=4 and N=8, and so N+K−1=11 (distinct) wavelengths may be used. In such a case, each connection between lower 177 and upper 175 tier optical routing elements may carry 8 non-overlapping (distinct) wavelengths. Similarly, each connection between the upper tier optical routing elements 175 and the optical component 920 may carry 8 non-overlapping wavelengths. Each of the connections between the upper tier optical routing elements 175 and the optical component 920 may terminate at a different port of the optical component 920. The allocation of the non-overlapping wavelengths may be determined (e.g. optimized) using a MILP model.

In some examples of the arrangement of FIG. 12 where the cells 912 are according to the arrangement of FIG. 11, the cells 912 may be arranged to use more than eight wavelengths, such that for each group of servers, a plurality of wavelengths will be directed to the associated lower tier optical routing element 177. In such cases, routing of the signal between the lower tier optical routing element and the optical component 920 can be controlled by the wavelength transmitted by the group of servers.

Current passive optical networks (PONs) in access networks (e.g. as studied in J. Baliga, R. W. A. Ayre, W. V. Sorin, K. Hinton, and R. Tucker, "Energy Consumption in Access Networks," in Optical Fiber communication/National Fiber Optic Engineers Conference, 2008. OFC/NFOEC 2008. Conference on, 2008, pp. 1-3) do not perform well for rates above 1 Gb/s where point to point fibre links may become more energy efficient than a PON. However, the cellular architecture of FIG. 11, for example, may avoid some of the limitations of the PONs described in Baliga, et al. According to the arrangement of FIG. 11, (i) within a group of servers 110 (e.g. a rack of servers), the backplane, or FBG can provide full wavelength rate, (ii) within the groups of servers 110*a*-110*h* connected to a particular upper optical routing element 170 (e.g. a cell 912 of racks), the intermediate passive optical routing elements 540*a*, 540*b* give full wavelength connectivity and hence server to server communication can appear as point to point, and (iii) communication between cells (i.e. between a server connected to a first upper optical routing element 170 and a server connected to a second upper optical routing element 170) may be via optical component 300. According to the arrangement of FIG. 12, where each cell 912 corresponds to the cell 912 shown in FIG. 11, intra-group communication and inter-group communication (within a cell) are according to (i) and (ii), above. However, inter-cell communication may differ from (iii), above. In particular, in the arrangement of FIG. 12, inter-cell communication (communication between a sever in a first cell 910-1 and a server in a second cell 910-2) may be routed via two tiers of upper optical routing elements, a first (upper) tier of upper optical routing elements 175-1 to 175-*n* routes signals between the second (lower) tier of upper optical routing elements 177-1 to 177-*n* and a plurality of optical components 905-1 to 905-4 (e.g. OLT switches/OLT cards/OLT ports). The second (lower) tier of upper optical routing elements 177-1 to 177-*n* routes signals between the groups of servers of a particular cell 912 and the first (upper) tier of upper optical routing elements 175-1 to 175-*n*.

The arrangement according to FIG. 12 is less likely (e.g. compared to an arrangement where each cell 912 is connected to a single optical component 300, e.g. as shown in FIG. 11) to suffer passive optical network limitations due to sharing of wavelength by servers through TDM MAC (time division multiplexing media access control) in inter-cell communication. For example, over subscription may be reduced in the arrangement of FIG. 12. In some arrangements, each of the optical routing elements in the first 175 and second 177 tiers of upper optical routing elements may be AWGRs.

The optical components 905 may be optical switching elements (e.g. an OLT switch). Each of the optical components may have two or more optical ports for receiving and/or sending optical signals. Each of the cells 912 of FIG. 12 may be a sub-network. Each sub-network may include a first group of ports and a second group of ports for communication with first and second groups of servers, respectively. According to some examples, one or more of the sub-networks may be a passive optical network, such that, for example, routing of communication between the first and second groups of optical ports of the first sub-network and the first lower tier optical routing element is passive.

Each of the upper 175 and lower 177 tier optical routing elements may route optical signals based on a wavelength of the signal and an input port at which the signal is received. Each sub-network (i.e. the groups of ports/servers 110 therein) may be arranged to communicate with a respective lower tier optical routing element 177. Each lower tier optical routing element 177 may be arranged to route signals between its corresponding sub-network and each of the upper tier optical routing elements 175. Each of the upper tier optical routing elements may be arranged to route signals between each of the lower tier optical routing elements and each of the active optical switching elements.

The upper tier optical routing elements and lower tier optical routing elements may form respective passive optical communication paths between the groups of each network and each of the active optical switching elements.

Each passive optical communication path between a first group of optical ports in the first sub-network and each of the active optical switching elements may be associated with a wavelength that is different from wavelengths associated with each other passive optical communication path between the first group of optical ports and each other active optical switching element.

Figure 13A:
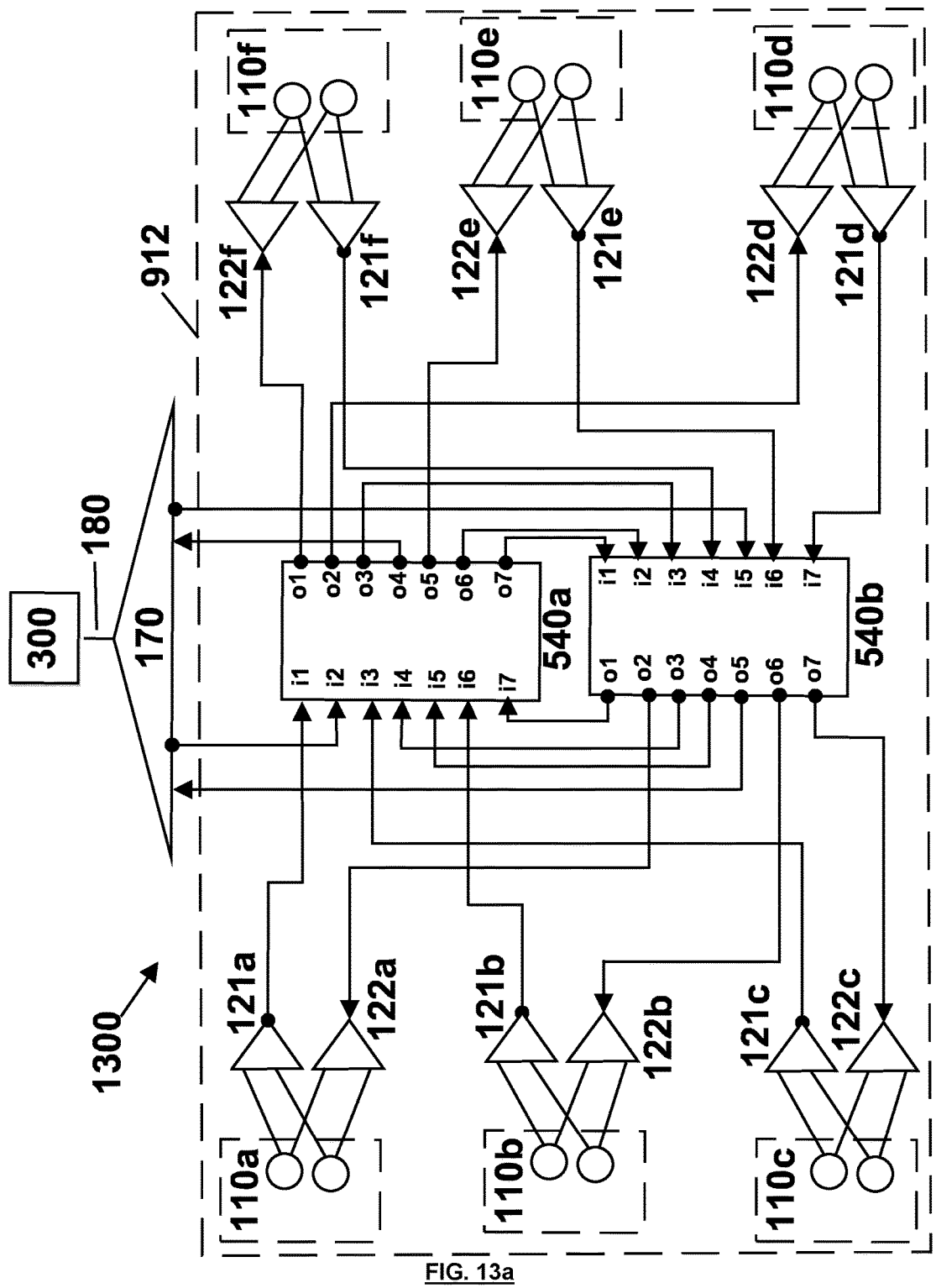
FIG. 13a illustrates a network, or sub-network according to some embodiments.

FIG. 13a illustrates an arrangement providing for inter-group communication comprising inter-group communication paths that route between any group of servers 110a-f and any other group of servers 110a-d hierarchically below the upper passive optical routing element 170. According to the arrangement 1300 in FIG. 13a, these inter-group communication paths may be passive communication paths. Embodiments according to the arrangement of FIG. 13a provide inter-group communication paths that are not routed via the upper passive optical routing element 170, which may reduce power consumption and load at the optical component 300 (e.g. an OLT switch) to which the upper passive optical routing element connects, since inter-group communication does not need to be routed via the upper passive optical routing element 170 and the optical component 300. In some embodiments according to the arrangement of FIG. 13a, the upper passive optical routing element 170 may be an AWGR.

The inter-group communication path is via the respective lower passive optical routing elements 121a-f, 122a-f associated with respective groups servers 110a-f to which the transmitting and receiving servers belong, and via one or more intermediate passive optical routing element 540a-b. The arrangement of FIG. 13a shows two intermediate passive optical routing elements 540a-b; these may route optical signals from a plurality of input ports to a plurality of output ports, with the output depending on the wavelength of the input signal and the input port that received the input signal. The intermediate passive optical routing element 540a-b may be an AWGR, for example.

The intermediate passive optical routing elements 540a-b may be connected to the groups of servers by uplink lower passive optical routing elements 121a-f and downlink lower passive optical routing elements 122a-f, similar to the arrangement in FIG. 11. Traffic (optical signals) from the groups of servers 110a-f is arrives at an output port of the uplink lower passive optical routing element 121a-f (e.g. a star coupler) connected to the inputs of the intermediate passive optical routing elements 540a-b (e.g. AWGRs).

In the embodiment of FIG. 13a, each server (e.g. a network interface card of the server) has an array of fixed, tuned receivers and a tunable laser for wavelength detection and selection. In other embodiments a multi-wavelength source other than a laser may be used, such as a spectrum sliced LED. The illustrative arrangement of FIG. 13a makes use of eight wavelengths, and so the receivers are arranged to receive at least eight distinct wavelengths, and the tunable laser is arranged to output signals of at least eight distinct wavelengths.

In the arrangement of FIG. 13a, six groups of servers 110a-f are connected via two intermediate passive optical routing elements 540a-b. In this example, each intermediate passive optical routing element 540a-b receives an input from three of the groups of servers 110a. More specifically, the first intermediate passive optical element 540a receives input from the first 110a and second 110b and third 110c groups of servers, via the respective uplink lower passive optical routing elements 121a, 121b, 121c. In FIG. 13a, the input from the first group of servers 110a is received at the first input port i1 of the first intermediate passive optical routing element 540a, the input from the second group of servers 110b is received at the sixth input port i6 of the first intermediate passive optical routing element 540a, and the input from the third group of servers 110c is received at the third input port i3 of the first intermediate passive optical routing element 540a. Similarly, the second intermediate passive optical routing element 540b receives inputs from the fourth 110d, fifth 110e and sixth 110f groups of servers, via the respective uplink lower passive optical routing elements 121d, 121e, 121f at the seventh i7, sixth i6 and fourth i4 input ports, respectively.

Each of the first and second intermediate passive optical routing elements 540a,b also receives input from the upper passive optical routing element 170, specifically at the second i2 and fifth i5 input ports, respectively. Each of the first and second intermediate passive optical routing element 540a-b also receives inputs from the other intermediate passive optical routing element 540a-b. Specifically, the first intermediate passive optical routing element 540a receives input at the fourth i4, fifth i5 and seventh i7 input ports from, respectively, the third o3, fourth o4 and first o1 output ports of the second intermediate passive optical routing element 540b. The second intermediate passive optical routing element 540b receives input at the first i1, second, i2 and third i3 input ports from, respectively, the seventh i7, sixth i6 and third i3 output ports of the first intermediate passive optical routing element 540a.

Accordingly, in the embodiment of FIG. 13a, each group of servers is connected to an input port of one of the intermediate passive optical routing elements 540a-b. Furthermore, the upper passive optical routing element 170 is connected to an input port of each of the intermediate passive optical routing elements 540a-b. One or more output ports of the intermediate passive optical routing elements 540a-b are each connected to a respective input port of another of the intermediate passive optical routing elements 540a-b.

In the arrangement of FIG. 13a, each intermediate passive optical routing element 540a-b has respective input ports connected to three groups of servers 110a-f, an input port connected to the upper passive optical routing element 170 and at least one (three in FIG. 13a) input port connected to another of the intermediate passive optical routing elements 540a-b.

Each intermediate passive optical routing element 540a-b has three output ports connected to groups of servers 110a-f; the groups of servers 110a-f connected to the output ports being different from the groups of servers 110a-f connected to the input ports. Each intermediate passive optical routing element 540a-b also has an output port connected to the upper passive optical routing element 170 and at least one (three in FIG. 13a) output port connected to another of the intermediate passive optical routing elements 540a-b.

In the embodiment of FIG. 13a, the first intermediate passive optical routing element 540a has output ports o2, o5, o1 respectively connected to the fourth 110d, fifth 100e and sixth 110f groups of servers (different from the first 110a, second 110b and third 110c groups of servers connected to the input ports of the first intermediate passive optical routing element 540a.) The first intermediate passive optical routing element 540a also has an output port o4 connected to the upper passive optical routing element 170 and output ports o3, o6 and o7 connected, respectively, to the input ports i3, i2 and i1 of the second intermediate passive optical routing element 540b.

Similarly, the second intermediate passive optical routing element 540b has output ports o2, o6, o7 respectively connected to the first 110a, second 110b and third 110c groups of servers (different from the fourth 110d, fifth 110e and sixth 110f groups of servers connected to the input ports of the second intermediate passive optical routing element 540b.) The second intermediate passive optical routing element 540b also has an output port o5 connected to the upper passive optical routing element 170 and output ports o1, o3, o4 connected, respectively to input ports i7, i4 and i5 of the first intermediate passive optical routing element 540a.

Figure 13B:
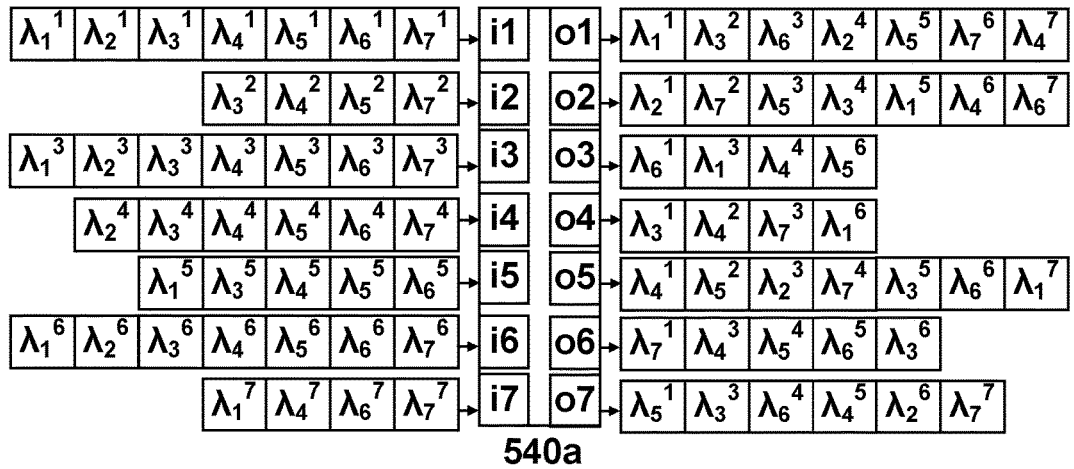
FIG. 13b illustrates routing by passive optical routing elements suitable for use in embodiments according to FIG. 13a FIG. 14 illustrates a network according to some embodiments.
Figure 13B:
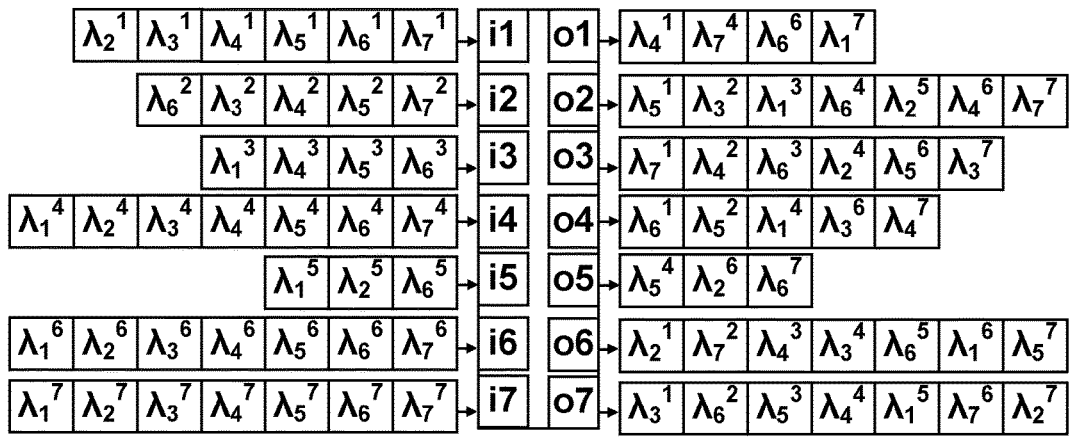

FIG. 13b illustrates the routing of input signals to output ports in the first and second intermediate passive optical routing elements 540a-b in the arrangement of FIG. 13a.

FIG. 13b shows the wavelengths input to respective ports, and the corresponding output. The subscript indicates the wavelength, and the superscript indicates the input port. Note that the input ports of the second intermediate passive optical routing element 540b are shown to the left in FIG. 13b, but are to the right in FIG. 13a.

The signals at each output port depend on the wavelength of the signal (subscript) and the input port at which the signal was received (superscript). For example, a signal of wavelength 1, received at input port i1 of the first intermediate passive optical routing element 540a is denoted $\lambda_1^1$ and is output at output port o1. Similarly, a signal of wavelength 2, received at input port i3 is denoted $\lambda_2^3$ and is output at output port o5.

Table 3 illustrates the wavelengths used to send a signal from a source to a destination according to the arrangement of FIGS. 13a and 13b.

TABLE 3

| | | Destination | | | | | | |
|---|---|---|---|---|---|---|---|---|
| | | 110a | 110b | 110c | 110d | 110e | 110f | 170 |
| Source | 110a | 5 | 7 | 6 | 2 | 4 | 1 | 3 |
| | 110b | 3 | 2 | 5 | 4 | 6 | 7 | 1 |
| | 110c | 1 | 4 | 3 | 5 | 2 | 6 | 7 |
| | 110d | 7 | 5 | 2 | 3 | 1 | 4 | 6 |
| | 110e | 4 | 1 | 7 | 6 | 3 | 5 | 2 |
| | 110f | 6 | 3 | 4 | 1 | 7 | 2 | 5 |
| | 170 | 2 | 6 | 1 | 7 | 5 | 3 | |

The optical paths between the respective lower passive optical routing element 121a-f, 122a-f and the upper passive optical routing element 170 are referred to as lower optical communication paths. In FIG. 13a the lower optical communication paths 130 are not labeled.

The arrangement of FIGS. 13a and 13b have some similarities with the arrangements of FIGS. 5, 6, 7a and 7b. The arrangement of FIGS. 13a and 13b differs from the previously described arrangements in that a path is provided, via the intermediate passive optical routing elements 540a-b, for intra-group communication. That is, a server in the first group of servers 110a may communicate with another server in the same group 110a via the uplink lower passive optical routing element 121a, each of the intermediate passive optical routing elements 540a and 540b, and the downlink lower passive optical routing element 122a. As can be seen from Table 3, this may be performed using wavelength 5, which is routed from the first input i1 of the first intermediate passive optical routing element 540a to the seventh output o7 of the first intermediate passive optical routing element 540a. The signal is then routed to the first input i1 of the second intermediate passive optical routing element 540b, and to the second output o2 of the second intermediate passive optical routing element 540b. The signal is then routed to the first group of servers 110a via the corresponding downlink lower passive optical routing element 122a.

As an example of inter-group communication, a signal from the first group of servers 110a to the sixth group of servers 110f would be transmitted from a server in the first group at wavelength 1, and would be routed, via the uplink lower passive optical routing element 121a, to the first input of the first intermediate passive optical routing element 540a, leaving the first intermediate passive optical routing element 540a at the first output of the first intermediate passive optical routing element 540a. The signal then arrives at the downlink lower passive optical routing element 122f and then arrives at the sixth group of servers 110f.

According to this arrangement, it is not necessary to provide an optical backplane, FBG, or other separate mechanism for intra-group communication. Accordingly, the structure of the groups may be simplified. Where a separate mechanism for intra-group communication is provided in an arrangement according to FIGS. 13a and 13b, the provision of intra-group communication paths via the intermediate passive optical routing elements 540a-b, provides redundancy for intra-group communication, which may improve robustness of the system and/or allow for an increase intra-group bandwidth.

The examples according to the arrangement of FIGS. 13a and 13b permits n+1 signal destinations to be addressed using n+1 different wavelengths. According to some examples, $(n+1)^2 - 1$ fibers (i.e. distinct paths) may be needed. The Example of FIGS. 13a and 13b does not include a path from the upper passive optical routing element 170 back to the upper passive optical routing element 170 (in some examples the optical component, such as an OLT, does not need to communicate with itself via the network 910), so the number of paths is one less than $(n+1)^2$, as can be seen in Table 3. The parameter n is 6 in the illustrated example. In the illustrated example, the sources and destinations of the signals are considered to be the groups of servers 110a-f and the upper passive optical routing element 170 (or the upper optical communication path 180 and optical component 300, beyond the upper passive optical routing element 170). According to such examples, an arrangement with 6 groups of servers (n=6) uses 7 wavelengths and has 48 connections/paths.

As in the arrangements of FIGS. 5 and 7a, passive isolators may be used at the inputs to the lower passive optical routing elements 121a-h, 122a-h, but are not shown in FIG. 13a.

Figure 14:
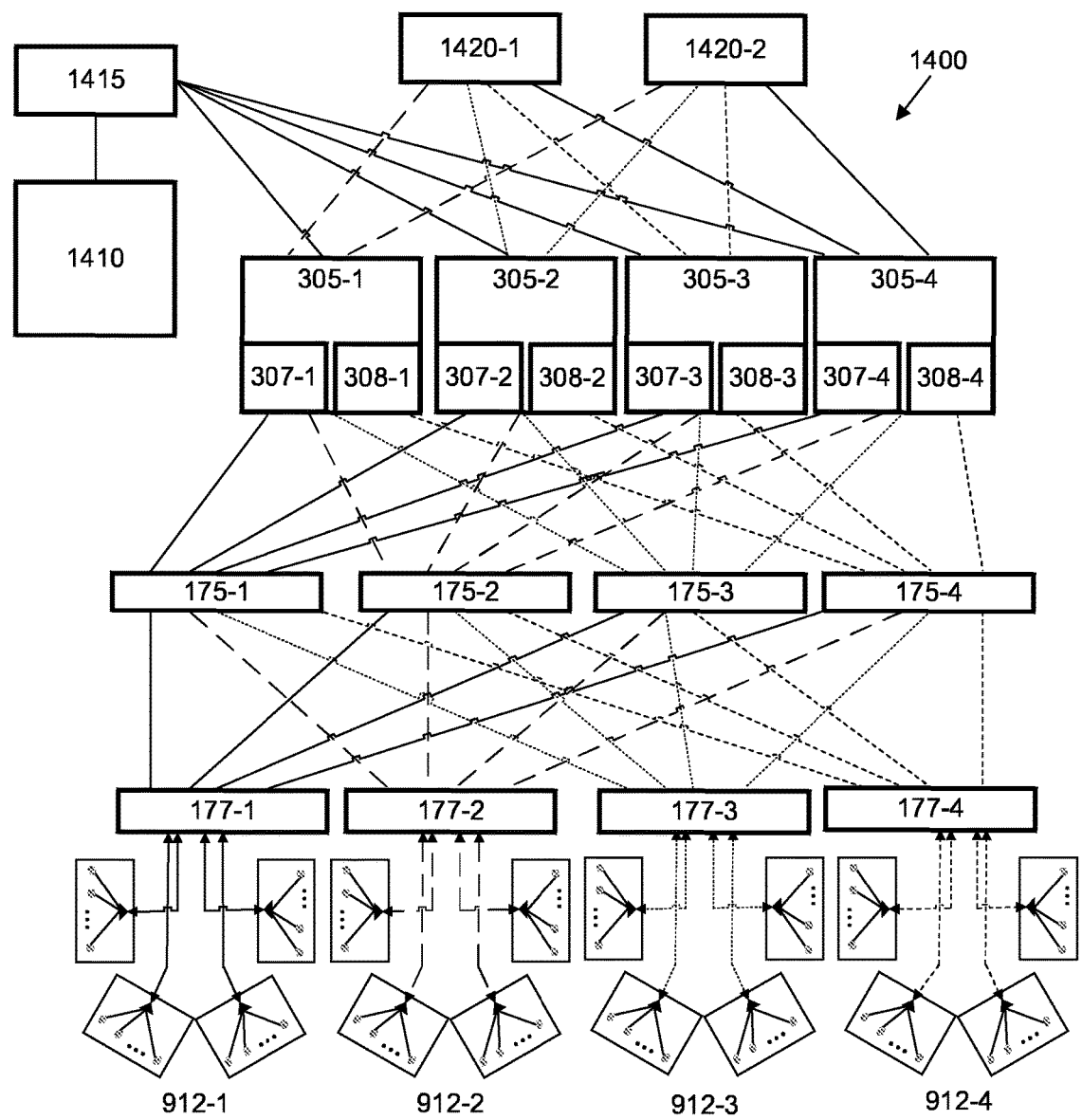

FIG. 14 illustrates a network according to some examples. This arrangement is similar to that in FIG. 12, with regard to the arrangement of the cells/sub-networks 912 (which are shown schematically on FIG. 14), and the lower 177 and upper 175 tier routing elements. FIG. 14 shows uplink connections between the lower tier passive optical routing element 177 and the optical elements 305; a similar arrangement may be used for downlink connections. Each of the upper tier routing elements 175 is connected with a plurality of optical components 305. Each of the optical components 305 may include a first set of optical switching elements 307 and a second set of optical switching elements 308, where the first set of optical switching elements 307 having a higher switching speed than the second set 308. For example, the first set of optical switching elements 307 may be OLT switches and the second set of optical switching elements 308 may be optical switches.

The first set of optical switches and the second set of optical switches may be connected to a control management system 1410 through a commodity switch 1415. Core routers 1420 provide for communication between the optical components 305. The commodity switch 1415, core routers 1420 and controller 1410 may facilitate communication between optical components 305 (e.g. OLT switches) connecting a large number of servers. The controller 1410 may be arranged to classify inter-cell flows and assign them paths, along with resources, based on data flow patterns (e.g. with respect to the flow size and duration of the flow). For example, where a flow is determined to be a mouse flow (e.g. where the flow is fewer than C packets, where C is a predetermined parameter), the controller will assign resources and select the proper wavelengths that communicating servers need to tune to so that they can be grouped to join the same OLT port/switch through efficient grooming. Hence communication overhead for flows traversing the core routers 1420 may be avoided or reduced, and power savings may be achieved. For elephant flows (e.g. where the flow occupies greater than 1% of total traffic in a time period, or where the flow has a size greater than the mean plus three standard deviations of the traffic during a time period) such as the case where a server needs to use a full wavelength, the controller may establish a circuit through an optical switch to establish a path between communicating entities in the different PON cells that avoids OLT traffic forwarding.

The controller 1410 may be arranged to control routing of signals of a data flow between sub-networks by assigning the data flow to an optical switching element in either the first set of active optical switching elements 307 or the second set of active optical switching elements 308. The assignment may be based on a size and/or duration of the flow.

The controller 1410 may categorize the flow as a mouse flow or an elephant flow, and perform the assignment based on the categorization.

The structure of the sub-networks 912 is not particularly limited. For example, each of the sub-networks may have a structure as outlined in relation to any of FIGS. 1 to 9. Where the sub-networks are passive optical networks, each server in each group of servers may need to have tuneable lasers/transceivers, in order to selectively communicate with a particular optical component 305. Where the sub-networks 912 include active elements (such as the arrangement of FIG. 8, some servers may not require tuneable lasers/transceivers.

The connections to the first set of active optical switching elements (from the upper tier optical routing elements) may be separate from the connections to the second set of active optical switching elements. However, these are not shown separately in FIG. 14 for simplicity.

According to some examples in accordance with the arrangement of FIG. 14, each cell/sub-network 912 may use N−1 distinct wavelengths for intra-cell communication, where N is the number of groups of servers 110. If the number of ports in the first and second sets of active optical switching elements 307, to which the upper tier optical routing elements are connected, are S and K, respectively, the total number of wavelengths used may be (N−1)+K+S. For the ports in the first 307 and second 308 sets of active optical switching elements, only N wavelengths of the (N−1)+K+S wavelengths may be used to communicate with the groups of servers 110 in the cell 912. For example, if there are 4 groups of servers in each cell, connected with 4 switching elements in each of the first and second sets of active optical switching elements, 3+4+4=11 wavelengths may be used. This may be independent on the number of cells 912.

A benchmarking study has been performed that compares the power consumption and cost of a data centre arranged according to an architecture consistent with that shown in FIGS. 11 and 12 to the most common data centre architectures; Fat-Tree and BCube (A. Hammadi and L. Mhamdi: Review: A survey on architectures and energy efficiency in Data Center Networks, Computer Communication, vol. 40, pp. 1-21, 2014.)

Figure 15A:
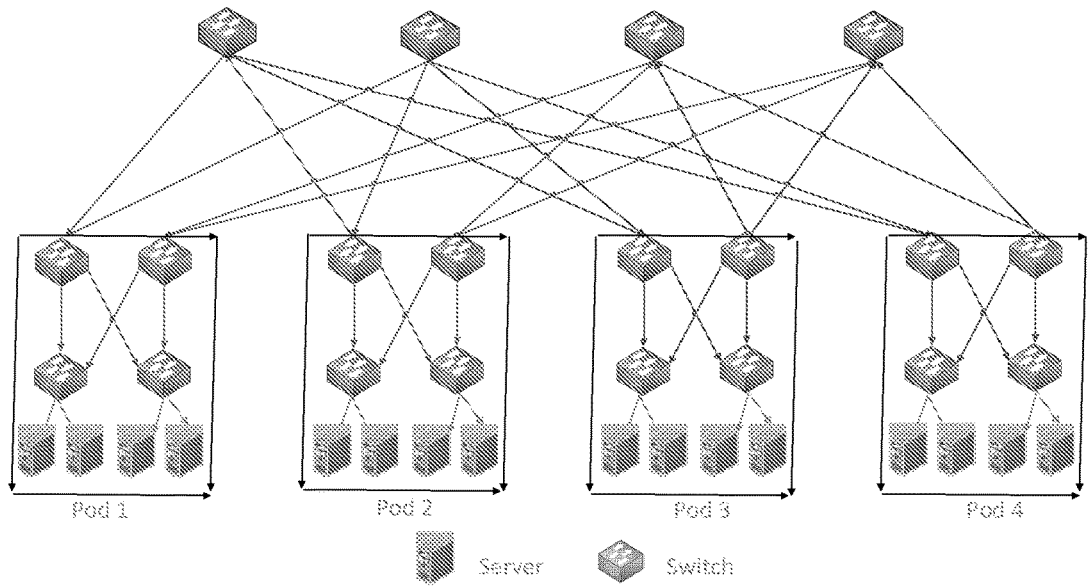
FIG. 15a illustrates a Fat-Tree data centre topology with n=4.
Figure 15B:
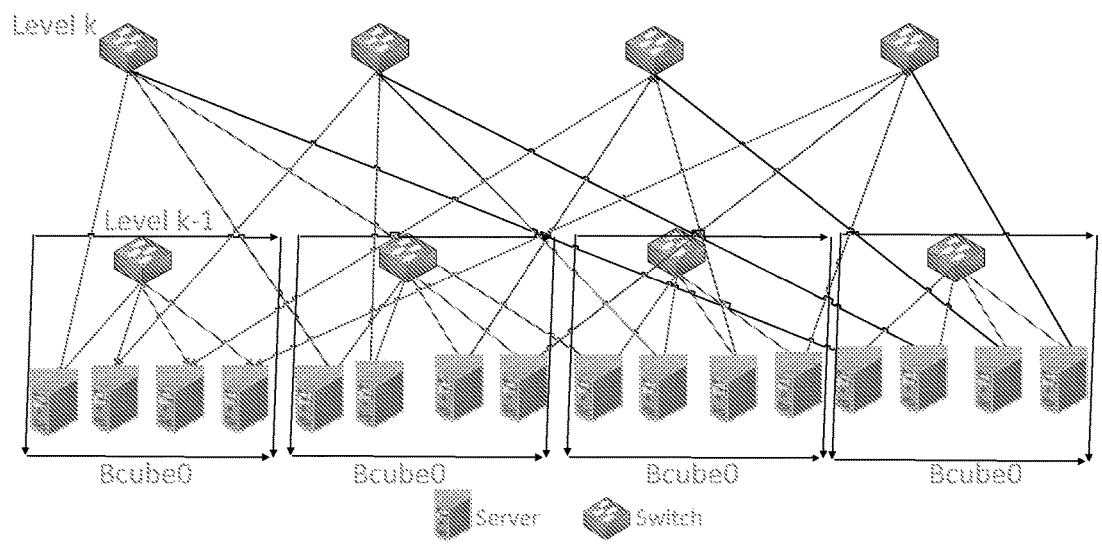
FIG. 15b illustrates a BCube data centre topology (BCube1) with n=4 and k=1.

The power consumption and cost was evaluated for the Fat-Tree architecture, illustrated in FIG. 15a, and BCube architecture, illustrated in FIG. 15b, for different fabric configurations. Fat-Tree architectures we considered with 24 and 48 pods to provision connectivity to 3,456 and 27,648 servers, respectively. The BCube architecture was evaluated with k=2, 3 and 4 for n=8 to provision connectivity to 512, 4096 and 32768 servers, respectively. The power consumption of the architecture of FIGS. 11 and 12 was evaluated with 64 servers arranged in 8 racks for each cell 910.

Figure 15C:
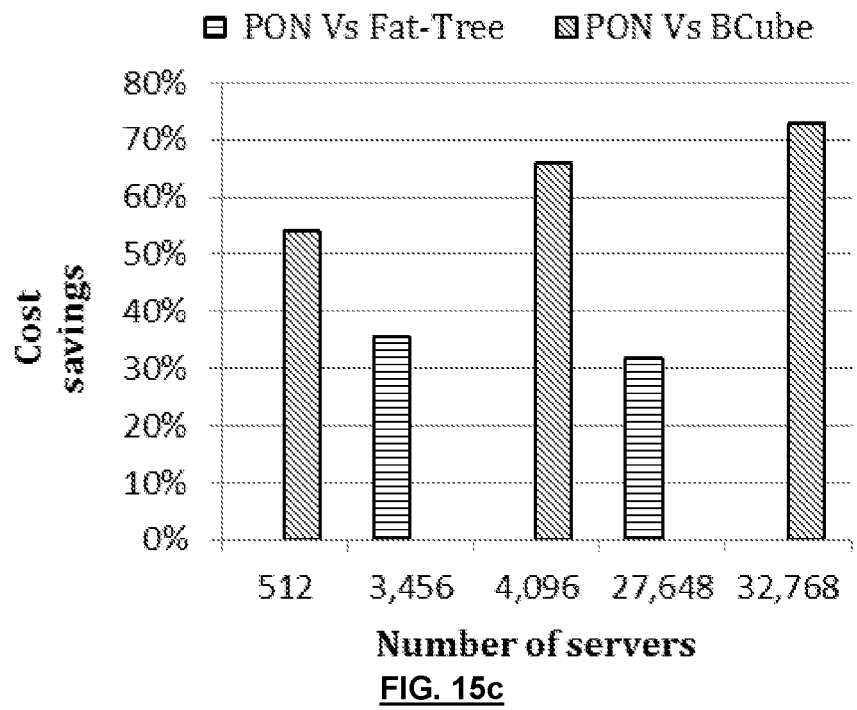
FIG. 15c illustrates cost benchmarking for an exemplary arrangement in accordance with FIGS. 11 and 12 against Fat-Tree and BCube topologies.
Figure 15D:
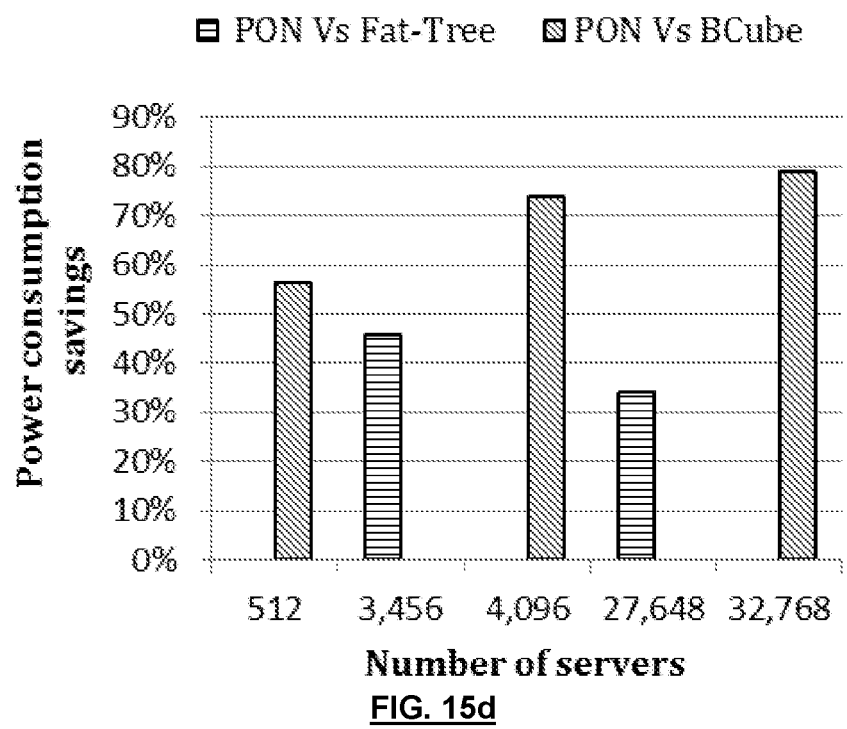
FIG. 15d illustrates power consumption benchmarking for an exemplary arrangement in accordance with FIGS. 11 and 12 against Fat-Tree and BCube topologies.

Table 4 shows the power consumption and cost of the equipment used for the benchmark evaluations. The inventors are not aware of any studies or vendors that have provided a power consumption specification for OLT PON that supports rates of 10 Gb/s. The GPON NEC CM7700S OLT (J. Baliga, R. W. A. Ayre, W. V. Sorin, K. Hinton, and R. Tucker, "Energy Consumption in Access Networks," in Optical Fiber communication/National Fiber Optic Engineers Conference, 2008. OFC/NFOEC 2008. Conference on, 2008, pp. 1-3) supports 1G data rate for typical distances of PON architectures in access networks (20 km) and consumes 12.5W per port. For the purposes of this evaluation, the power consumption of the 10 Gb/s OLT port was estimated assuming a linear power profile (note that power profile has increased below the linear trend recently). Thus, a 10 Gb/s OLT port was estimated to consume 125W. As a conservative estimate the reduction in power consumption due to the limited transmission distance in data centres was not considered. FIGS. 15c and 15d shows the power consumption and cost savings that may be achieved by deploying an architecture according to some examples of the arrangements of FIGS. 11 and 12, compared to the Fat-tree and BCube architectures. The high energy consumption and cost of BCube and Fat-Tree architectures is mainly due to the large number of switches used for the interconnections. These switches may be eliminated and replaced by passive optical devices in some arrangements according to examples herein. Therefore, an exemplary PON architecture may reduce the power consumption by 45% and 80% and reduced the cost by 35% and 72% compared to the Fat-tree and BCube architectures for 3,456 and 32,768 servers, respectively.

TABLE 4

| Equipment | Cost (USD) | Power Consumption (Watts) |
|---|---|---|
| OLT chassis | 5000* | 125 per port |
| System Controller Module (SCM) | 10,000* | |
| Switching Module (SM) | 25,000 | |
| Access Module (AM) | 15,000* | |
| 10 Gb/s Burst-mode with tuneable TRX ONU | 175** | 2.5** |
| Ethernet Transceiver | 74*** | 3*** |
| 8 ports commodity switch | 895[†] | 12[††] |
| 24 ports commodity switch | 1525[†] | 27[‡] |
| 48 ports commodity switch | 2850[†] | 39[‡‡] |

*C. Bhagat, K. Raje, R. Shetye and A. Vaity, "Technological and cost-based comparison of next generation PON technologies: 10GPON and WDM PON," in A capstone paper submitted as partial fulfilment of the requirements for degree of Masters in Interdisciplinary Telecommunications at the University of Colorado, Boulder, University of Colorado, USA, 2012.
**K. Grobe, M. Roppelt, A. Autenrieth, J. P. Elbers, and M. Eiselt, "Cost and energy consumption analysis of advanced WDM-PONs," Communications Magazine, IEEE, vol. 49, pp. s25-s32, 2011.
***"Intel PRO/1000 PT Server Adapter DataSheet," [Online]. Available: http://ark.intel.com/products/50497/Intel-PRO1000-PT-Server-Adapter.
[†][Online] Avaiable http://www.3anetwork.com/.
[††]"Cisco: Data sheet of Cisco-2960-8TC-L DataSheet," [Online]. Available: http://www.cisco.com/c/en/us/support/switches/catalyst-2960-8tc-l-compact-switch/model.html.
[‡]"Cisco: Data sheet of Cisco-2960-24TC-L DataSheet," [Online]. Available: http://www.cisco.com/c/en/us/support/switches/catalyst-2960-24tc-l-switch/model.html.
[‡‡]"Cisco: Data sheet of Cisco-2960-48TC-L DataSheet," [Online]. Available http://www.cisco.com/c/en/us/support/switches/catatalyst2960g-48tc-l-switch/model.html#DataSheets.

The BCube architecture has the highest power consumption and cost as it is a server centric architecture where servers are equipped with multiple transceivers needed to establish connectivity with all the levels. As the levels increase, the architecture can be scaled up to host more servers and the number of transceivers increases as each server needs to have connections with a switch in every level, hence the power consumption increases.

The Fat-tree architecture is a switch centric architecture and the savings in FIGS. 15c and 15d are lower (compared with the BCube architecture) as it is designed to have servers with single transceivers to connect to the Top of Rack (ToR) switch. The savings achieved by the example PON architecture compared to the Fat-Tree architecture decrease as the number of servers increases. This is because the power consumption and cost of the switches used to build the 24 pods and 48 pods Fat-Tree architectures do not increase linearly as the number of pods increases.

As described above, some embodiments provide full passive interconnection for intra-group communication, some embodiments provide full passive interconnection for inter-group communication, and some embodiments provide full passive interconnection for both intra-group and inter-group communication. Embodiments may provide scalable, low cost, energy-efficient, and high capacity interconnections infrastructure to accommodate the different traffic patterns in data centers.

In the above description, groups of ports and groups of servers 110a-d have been referred to interchangeably. It is to be understood that sending a signal to, or receiving a signal from, a port is equivalent to sending a signal to, or receiving a signal from, a server attached to that port. Further, it is noted that the network may be provided without the servers in situ, such that the network is able to operate when servers have been connected to the ports.

As used herein, the term "transceiver" describes a component or collection of components capable of transmitting and receiving signals/data. The transceivers may be optical transceivers, and may use light to carry the signals/data.

As used herein, the term "passive switching element" is device which can route a signal to a defined place, without the need to supply power to the device.

The term "active" is used herein to signify components that use power, or require a power supply to operate. Non-passive is used herein to include everything that is not passive including active components and hybrids of active and passive components.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A data centre network, comprising:
   a first group of optical ports for connection to respective servers of a first group of servers;
   a second group of optical ports for connection to respective servers of a second group of servers;
   a first passive optical routing element arranged to route optical communication signals between the first group of optical ports and a first optical communication path;
   a second passive optical routing element arranged to route optical communication signals between the second group of optical ports and a second optical communication path;
   an upper passive optical routing element arranged to:
      (i) route optical communication signals between the first optical communication path and an upper optical communication path, and
      (ii) route optical communication signals between the second optical communication path and the upper optical communication path,
   an inter-group passive optical communication path between a server of the first group of servers and a server of the second group of servers, wherein the inter-group passive optical communication path excludes the upper passive optical routing element;
   a first intra-group passive optical network, the first intra-group passive optical network forming passive optical communication paths between the servers in the first group of servers, and
   a second intra-group passive optical network, the second intra-group passive optical network forming passive optical communication paths between the servers in the second group of servers, wherein
   the first and second intra-group passive optical networks do not include the upper passive optical routing element.

2. The data centre network of claim 1, wherein the first intra-group passive optical network comprises a star reflector arranged to receive an optical signal from any server of the first group of servers and broadcast the optical signal to each other server of the first group of servers.

3. The data centre network of claim 1, wherein the first intra-group passive optical network comprises a fibre Bragg grating in the first optical communication path, the fibre Bragg grating arranged to:
   receive signals of a first wavelength and a second wavelength from the first group of servers,
   transmit signals of the first wavelength along the first optical communication path, and
   reflect signals of the second wavelength back to the servers of the first group of servers.

4. The data centre network of claim 1, wherein the first intra-group passive optical network comprises a passive polymer optical backplane.

5. The data centre network of claim 1, wherein each of the first and second passive optical routing elements and the upper passive optical routing element is selected from the group consisting of a star splitter/coupler, or an array waveguide router.

6. The data centre network of claim 1, wherein signals routed via each of the first optical communication path, second optical communication path and upper optical communication path are to be at least one of time-division multiplexed and frequency-division multiplexed.

7. A data centre network, comprising:
  a first group of optical ports for connection to respective servers of a first group of servers;
  a second group of optical ports for connection to respective servers of a second group of servers;
  a first lower passive optical routing element arranged to route optical communication signals between the first group of optical ports and a first lower optical communication path;
  a second lower passive optical routing element arranged to route optical communication signals between the second group of optical ports and a second lower optical communication path;
  an upper passive optical routing element arranged to:
    (i) route optical communication signals between the first lower optical communication path and an upper optical communication path, and
    (ii) route optical communication signals between the second lower optical communication path and the upper optical communication path, and
  N groups of optical ports for connection to respective servers of N groups of servers, the N groups of optical ports including the first group of optical ports and the second group of optical ports, and the N groups of servers including the first group of servers and the second group of servers,
  first and second intermediate passive optical routing elements, first and second intermediate passive optical routing elements each having N input ports for optical signals and N output ports for optical signals, first and second intermediate passive optical routing elements arranged such that each signal received at an input port is routed to an output port based on a wavelength of the signal, wherein
  for each input port, input signals of N distinct wavelengths are routed to different ones of the N output ports, and
  each input port and each output port of the first intermediate passive optical routing element is connected to one of a lower passive optical routing element associated with one of the groups of servers, the upper passive optical routing element, or the second intermediate passive optical routing element,
  each input and each output of the second intermediate passive optical routing element is connected to one of a lower passive optical routing element associated with one of the groups of servers, the upper passive optical routing element, or the first intermediate passive optical routing element, and
  the first and second lower optical communication paths include at least one of the first and second intermediate passive optical routing elements.

8. A data centre network, comprising:
  a first group of optical ports for connection to respective servers of a first group of servers;
  a second group of optical ports for connection to respective servers of a second group of servers;
  a first lower passive optical routing element arranged to route optical communication signals between the first group of optical ports and a first lower optical communication path;
  a second lower passive optical routing element arranged to route optical communication signals between the second group of optical ports and a second lower optical communication path;
  an upper passive optical routing element arranged to:
    (i) route optical communication signals between the first lower optical communication path and an upper optical communication path, and
    (ii) route optical communication signals between the second lower optical communication path and the upper optical communication path, and
  a plurality of groups of optical ports for connection to respective servers of a plurality of groups of servers, the plurality of groups of optical ports including the first group of optical ports and the second group of optical ports, and the plurality of groups of servers including the first group of servers and the second group of servers,
  first and second intermediate passive optical routing elements, first and second intermediate passive optical routing elements each having a plurality of input ports for optical signals and a plurality of output ports for optical signals, first and second intermediate passive optical routing elements arranged such that each signal received at an input port is routed to an output port based on a wavelength of the signal, wherein
  for each input port, input signals of distinct wavelengths are routed to different ones of the output ports, and
  each input port and each output port of the first intermediate passive optical routing element is connected to one of a lower passive optical routing element associated with one of the groups of servers, the upper passive optical routing element, or the second intermediate passive optical routing element,
  each input and each output of the second intermediate passive optical routing element is connected to one of a lower passive optical routing element associated with one of the groups of servers, the upper passive optical routing element, or the first intermediate passive optical routing element, and
  the first and second lower optical communication paths include at least one of the first and second intermediate passive optical routing elements.

9. The data centre network of claim 8, having a first intra-group communication path between the first group of optical ports and the first group of optical ports, the first intra-group communication path including the first lower passive optical element and at least one of the first and second intermediate passive optical routing elements.

10. The data centre network of claim 8, wherein
  there are N groups of optical ports in the plurality of optical ports;
  the distinct wavelengths include N+1 distinct wavelengths.

11. A data centre network, comprising:
  a first group of optical ports for connection to respective servers of a first group of servers;
  a second group of optical ports for connection to respective servers of a second group of servers;
  a first passive optical routing element arranged to route optical communication signals between the first group of optical ports and a first optical communication path;

a second passive optical routing element arranged to route optical communication signals between the second group of optical ports and a second optical communication path;

an upper passive optical routing element arranged to:
  (i) route optical communication signals between the first optical communication path and an upper optical communication path, and
  (ii) route optical communication signals between the second optical communication path and the upper optical communication path, an inter-group passive optical communication path between a server of the first group of servers and a server of the second group of servers, wherein the inter-group passive optical communication path excludes the upper passive optical routing element;

a first routing server to receive optical signals from the servers of the first group of servers via a first lower passive optical routing element and retransmit the signals at respective wavelengths based on respective destinations of the signals, and wherein the first passive optical routing element is a first intermediate passive optical routing element associated with the first routing server to route signals from the first routing server to the upper passive optical routing element or to the second passive optical routing element, the second passive optical routing element being a second intermediate passive optical routing element associated with a second routing server.

12. The data centre network of claim 11, wherein:
the second routing server is configured to receive optical signals from the servers of the second group of servers via a second lower passive optical routing element and retransmit the signals at respective wavelengths based on respective destinations of the signals, and
the second intermediate passive optical routing element is associated with the second routing server to route signals from the second routing server to the upper passive optical routing element or an intermediate passive optical routing element associated with a routing server other than the second routing server.

13. The data centre network of claim 11, wherein the first routing server receives signals from at least two groups of servers via respective lower passive optical routing elements.

14. A data centre network, comprising:
a first group of optical ports for connection to respective servers of a first group of servers;
a second group of optical ports for connection to respective servers of a second group of servers;
a first lower passive optical routing element arranged to route optical communication signals between the first group of optical ports and a first lower optical communication path;
a second lower passive optical routing element arranged to route optical communication signals between the second group of optical ports and a second lower optical communication path;
an upper passive optical routing element arranged to:
  (i) route optical communication signals between the first lower optical communication path and an upper optical communication path, and
  (ii) route optical communication signals between the second lower optical communication path and the upper optical communication path, and
a first set optical ports for connection to respective servers comprising a first plurality of groups of optical ports, the first plurality of groups of optical ports including the first group of optical ports;
a second set of optical ports connection to respective servers comprising a second plurality of groups of optical ports, the second plurality of groups of optical ports including the second group of optical ports, wherein
the first set of optical ports includes a first set-linking group of optical ports, each optical port in the first set-linking group of optical ports being in optical communication with an inter-set communication path,
the second set of optical ports includes a second set-linking group of optical ports, each optical port in the second set-linking group of optical ports being in optical communication with the inter-set communication path,
the data centre network further comprising a first intra-set communication path arranged to route signals between servers connected to optical ports in the first group of optical ports and servers connected to optical ports in the first set-linking group of optical ports, and
the data centre network further comprising a second intra-set communication path arranged to route signals between servers connected to optical ports in the second group of optical ports and servers connected to optical ports in the second set-linking group of optical ports.

15. A data centre network system comprising:
an optical line terminal switch, comprising a plurality of optical line terminal cards, the optical line terminal cards each having a plurality of optical line terminal ports;
a plurality of sub-networks connected to respective optical line terminal ports of the plurality of optical line terminal ports, wherein
at least one of the sub-networks is a network comprising
  a first group of optical ports for connection to respective servers of a first group of servers;
  a second group of optical ports for connection to respective servers of a second group of servers;
  a first passive optical routing element arranged to route optical communication signals between the first group of optical ports and a first optical communication path;
  a second passive optical routing element arranged to route optical communication signals between the second group of optical ports and a second optical communication path;
  an upper passive optical routing element arranged to:
    (i) route optical communication signals between the first optical communication path and an upper optical communication path, and
    (ii) route optical communication signals between the second optical communication path and the upper optical communication path, and
    an inter-group passive optical communication path between a server of the first group of servers and a server of the second group of servers, wherein the inter-group passive optical communication path excludes the upper passive optical routing element.

16. A data centre network system comprising:
a plurality of active optical switching elements, each optical switching element having a plurality of optical ports;
a plurality of sub-networks, a first sub-network of the plurality of sub-networks including a first group of optical ports for communication with a first group of servers and a second group of optical ports for communication with a second group of servers;

a plurality of lower tier optical routing elements arranged to passively route optical signals based on a wavelength of a received optical signal and an input port of the lower tier optical routing element at which the signal is received, the a plurality of lower tier optical routing elements including a first lower tier optical routing element; and a plurality of upper tier optical routing elements arranged to passively route optical signals based on a wavelength of a received optical signal and an input port of the upper tier optical routing element at which the signal is received, wherein the first and second groups of optical ports are arranged to communicate with the first lower tier optical routing element, the first lower tier optical routing element is arranged to route signals between the first sub-network and each of the plurality of upper tier optical routing elements, each of the upper tier optical routing elements is arranged to route signals between each of the lower tier optical routing elements and each of the plurality of active optical switching elements.

17. The data centre network system of claim 16, wherein the upper tier optical routing elements and lower tier optical routing elements form respective passive optical communication paths between the first group of optical ports and each of the active optical switching elements, and respective passive optical communication paths between the second group of optical ports and each of the active optical switching elements.

18. The data centre network system of claim 7, wherein each passive optical communication path between the first group of optical ports and each of the active optical switching elements is associated with a wavelength that is different from wavelengths associated with each other passive optical communication path between the first group of optical ports and each other active optical switching element.

19. The data centre network system of claim 16, wherein routing of communication between the first and second groups of optical ports and the first lower tier optical routing element is passive.

20. The data centre network system of claim 16, wherein the active optical switching elements include a plurality of first active optical switching elements and a plurality of second active optical switching elements, wherein the active optical switching elements of the first plurality have a higher switching speed than the active optical switching elements of the second plurality.

21. The data centre network system of claim 20, wherein the first plurality of active optical switching elements include a plurality of OLT switches, and the second plurality of active optical switching elements include a plurality of optical switches.

22. The data centre network system of claim 20, further comprising a controller arranged to control routing of signals of a data flow between the sub-networks by assigning an active optical switching element to each data flow between the sub-networks, the assigning to include assigning either an active optical switching element of the first plurality of active optical switching elements or an active optical switching element of the second plurality of active optical switching elements.

23. The data centre network system of claim 22, wherein the assigning is based on a size and/or duration of the flow between sub-networks.

24. The data centre network system of claim 22, wherein the assigning includes categorizing the flow as a mouse flow or an elephant flow, the controller to assign the flow to an active optical switching element of the first plurality of active optical switching elements if the flow is categorized as a mouse flow, and the controller to assign the flow to an active optical switching element of the second plurality of active optical switching elements if the flow is categoried as an elephant flow.

25. The data centre network system of claim 16, wherein the upper passive optical routing element is the lower tier optical routing element.

* * * * *